FIG. 2B

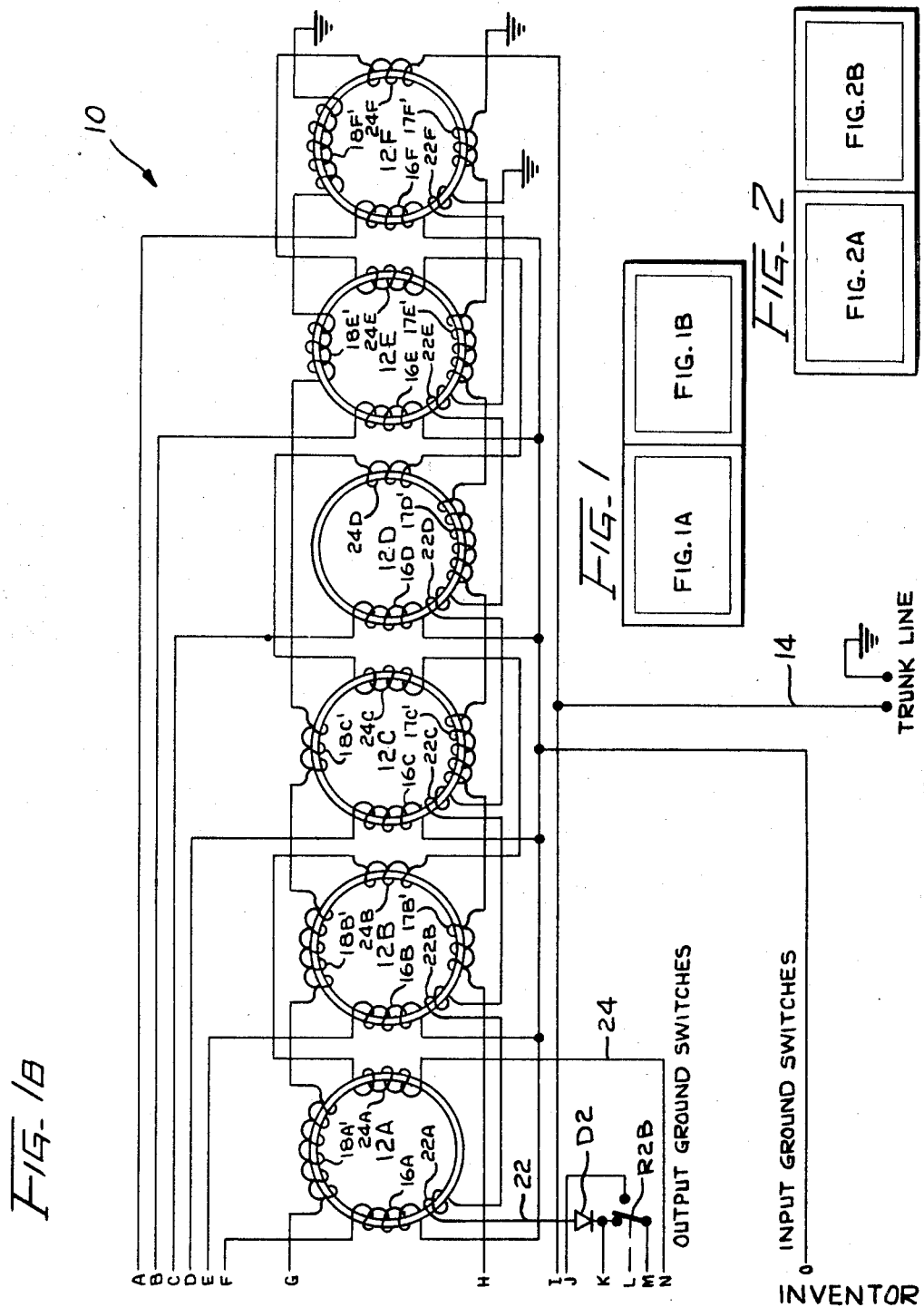

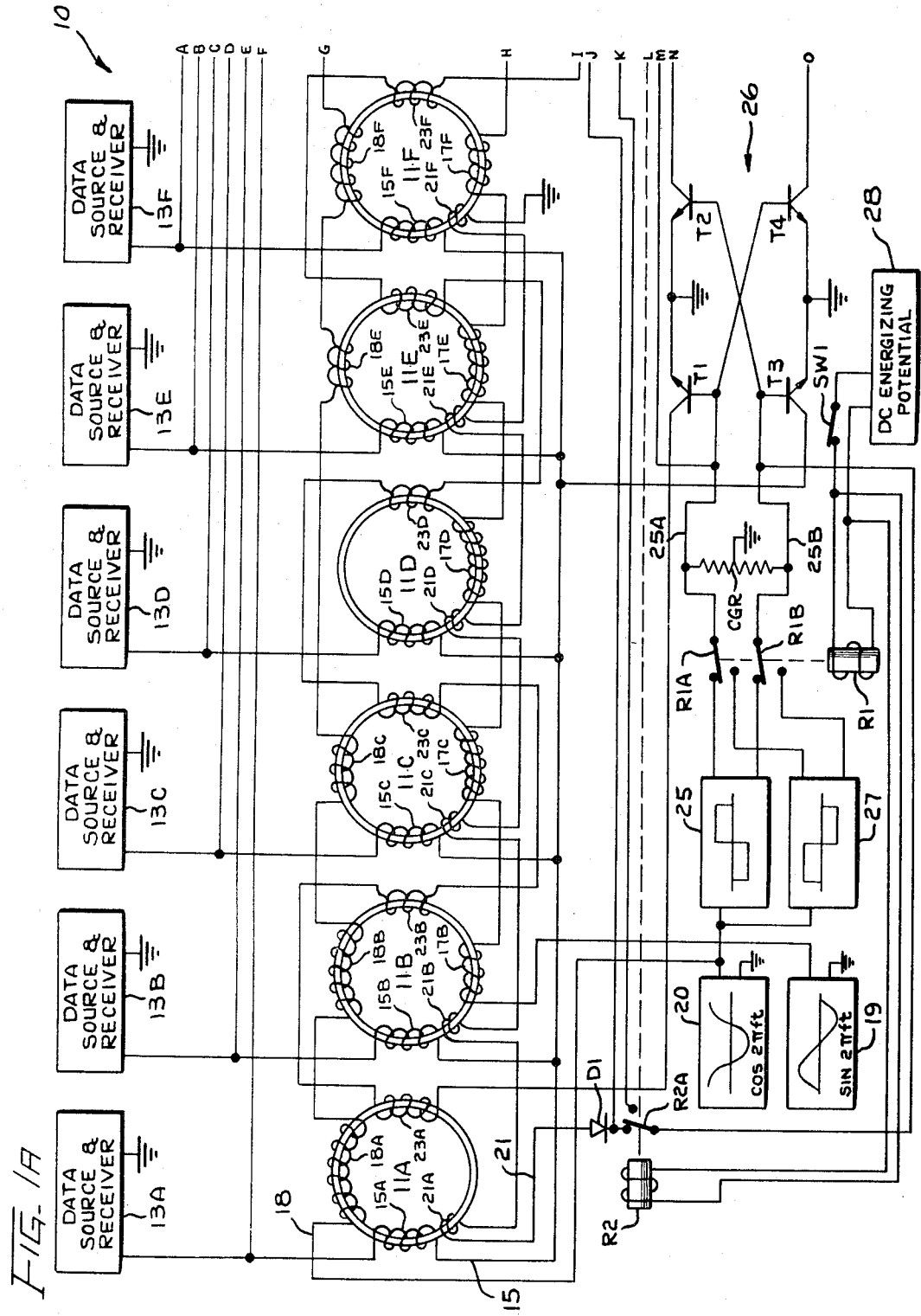

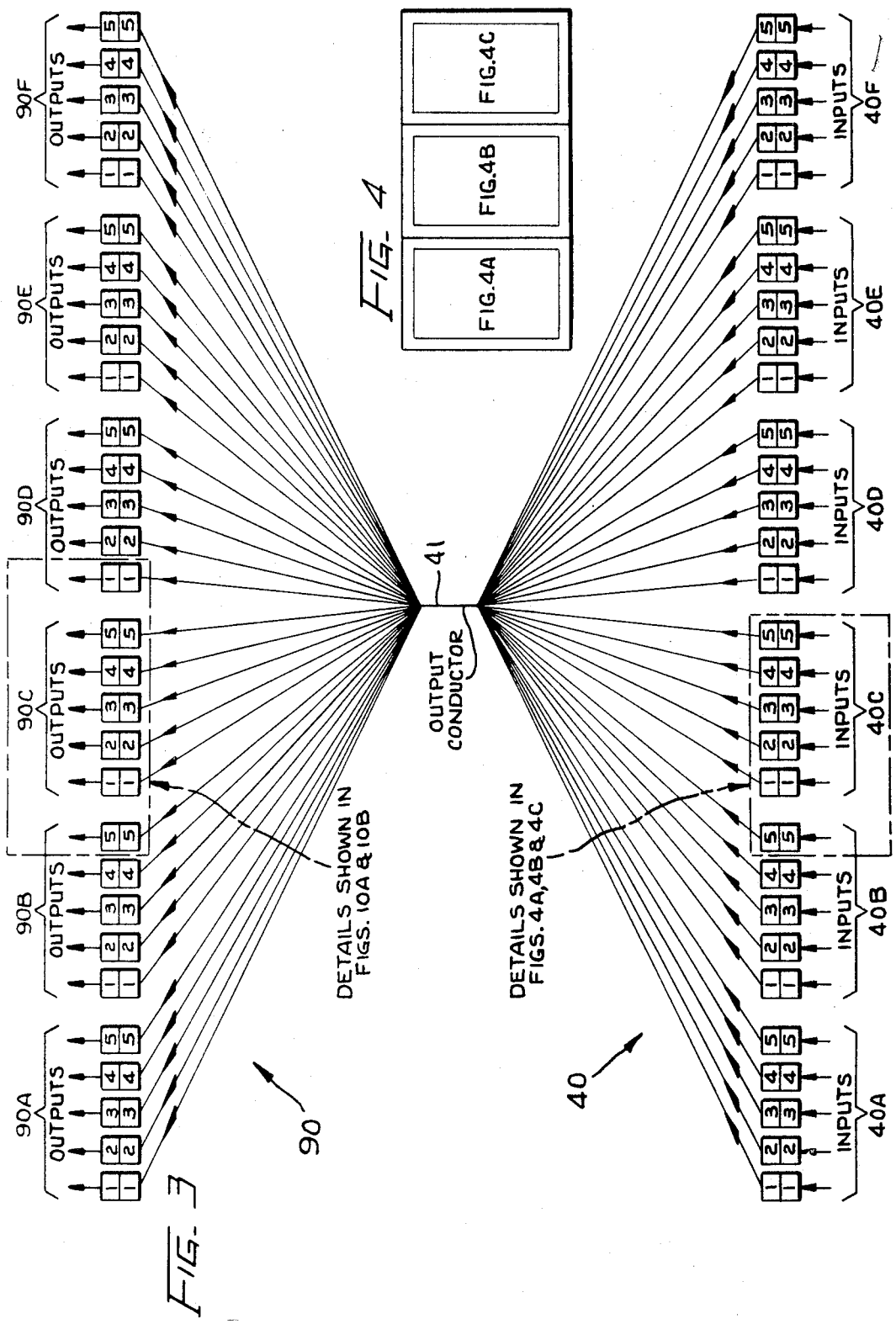

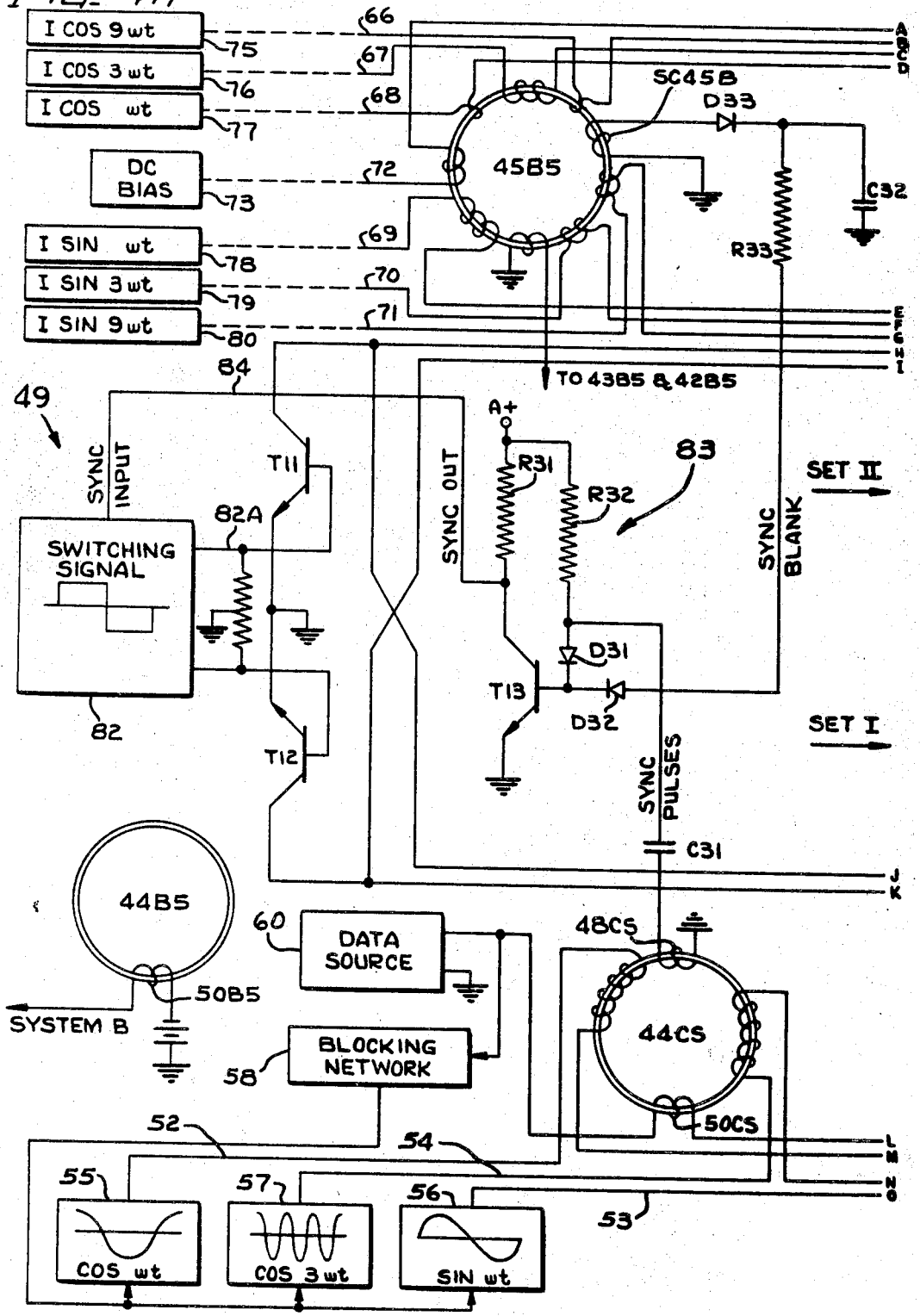

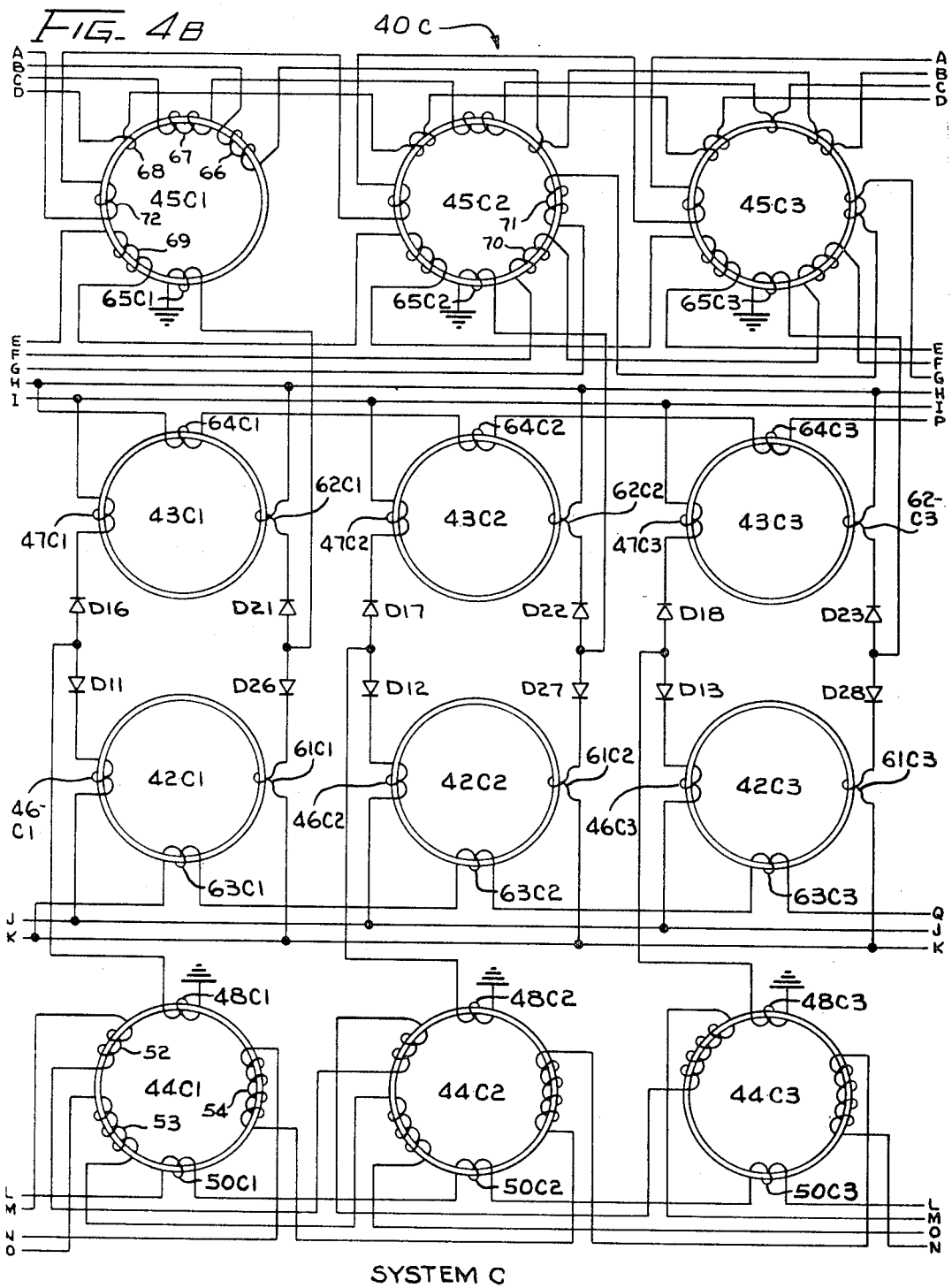

July 30, 1968  D. H. LIEN  3,395,250
MULTIPLEX TRANSMISSION SYSTEM INCLUDING
SEQUENTIAL PULSING CIRCUITRY
Original Filed May 2, 1962  15 Sheets-Sheet 8
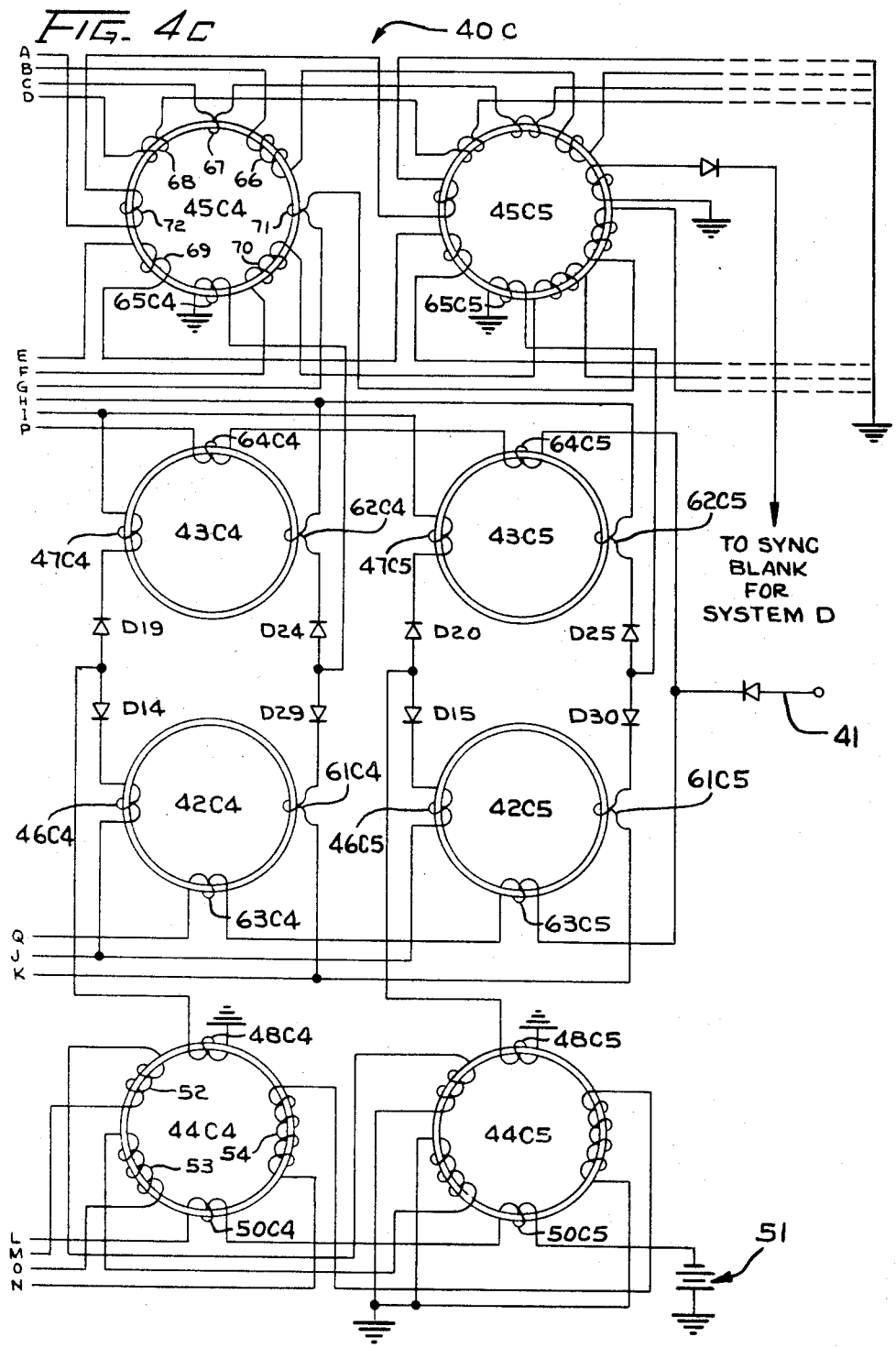

FIG. 5

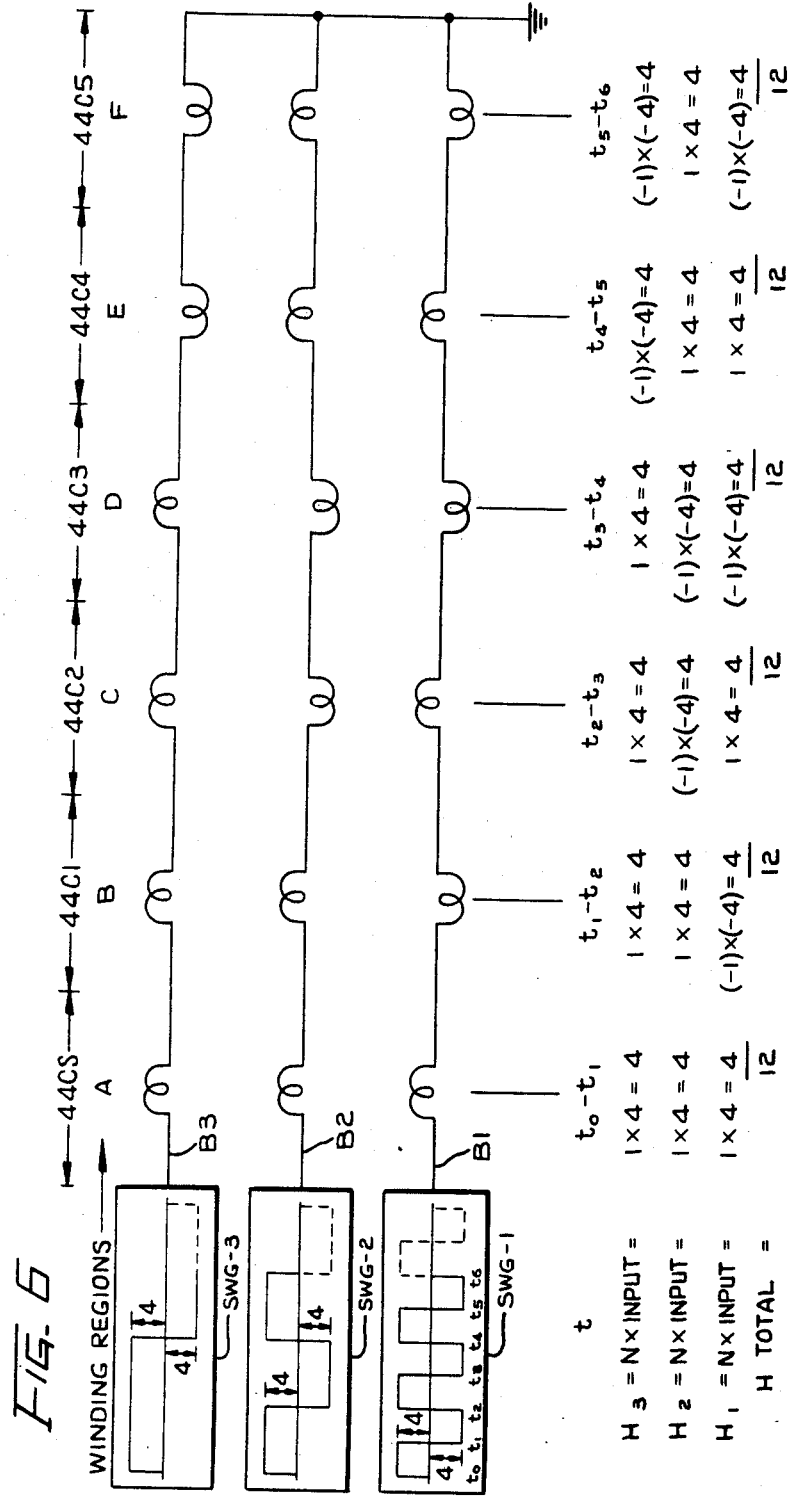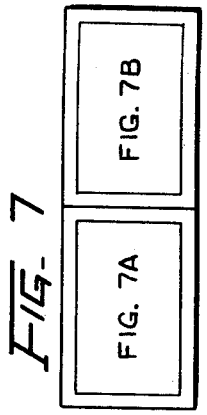

FIG. 7A

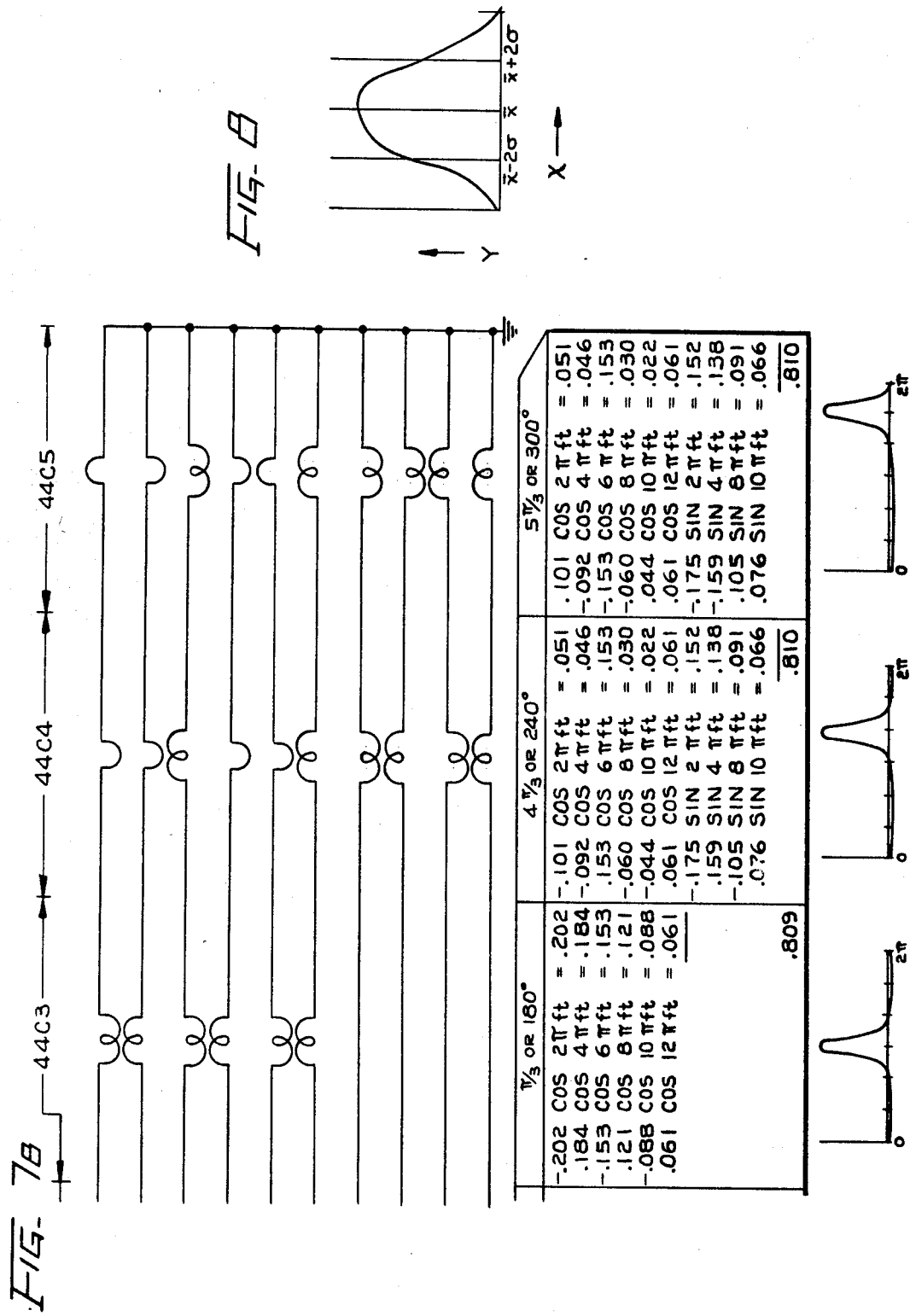

FIG. 11

| INPUT REACTOR CORE | ELECTROMAGNETICALLY ASSOCIATED FOR READ OUT WITH MEMORY DEVICES OF RECEIVING SYSTEM | | | | | |
|---|---|---|---|---|---|---|
| | 90A | 90B | 90C | 90D | 90E | 90F |
| 92A1 | | 91B5 | | | | |
| 92A2 | | | | | | |
| 92A3 | | | 91C4 | | | |
| 92A4 | | | | 91D3 | | |
| 92A5 | | | 91C5 | | | |
| 92B1 | | | | 91D4 | 91E2 | |
| 92B2 | | | | 91D5 | 91E3 | |
| 92B3 | | | | | 91E4 | 91F1 |
| 92B4 | | | | | 91E5 | 91F2 |
| 92B5 | | | | | | 91F3 |
| 92C1 | 91A1 | | | | | 91F4 |
| 92C2 | 91A2 | | | | | 91F5 |
| 92C3 | 91A3 | | | | | |
| 92C4 | 91A4 | | | | | |
| 92C5 | 91A5 | | | | | |
| 92D1 | | 91B1 | | | | |
| 92D2 | | 91B2 | | | | |
| 92D3 | | 91B3 | | | | |
| 92D4 | | 91B4 | | | | |
| 92D5 | | | 91C1 | | | |
| 92E1 | | | 91C2 | | | |
| 92E2 | | | 91C3 | | | |
| 92E3 | | | | 91D1 | | |
| 92E4 | | | | 91D2 | | |
| 92E5 | | | | | 91E1 | |

FIG. 9

| READ OUT REACTOR CORE | NUMBER OF TURNS OF CONTROL WINDING | | | | | |
|---|---|---|---|---|---|---|
| | COS 68 | SIN 69 | COS 67 | SIN 70 | COS 66 | SIN 71 |
| 45A1 | 32 | 0 | 32 | 0 | 32 | 0 |
| 45A2 | 31 | 7 | 26 | 19 | -10 | 31 |
| 45A3 | 29 | 13 | 10 | 31 | -26 | 19 |
| 45A4 | 26 | 19 | -10 | 31 | -26 | -19 |
| 45A5 | 21 | 24 | -26 | 19 | 10 | -31 |
| 45B1 | 16 | 28 | -32 | 0 | 32 | 0 |
| 45B2 | 10 | 31 | -26 | -19 | 10 | 31 |
| 45B3 | 3 | 32 | -10 | -31 | -26 | 19 |
| 45B4 | -3 | +32 | 10 | -31 | -26 | -19 |
| 45B5 | -10 | +31 | 26 | -19 | 10 | -31 |
| 45C1 | -16 | +28 | 32 | 0 | 32 | 0 |
| 45C2 | -21 | +24 | 26 | 19 | -10 | 31 |
| 45C3 | -26 | +19 | 10 | 31 | -26 | 19 |
| 45C4 | -29 | +13 | -10 | 31 | -26 | -19 |
| 45C5 | -31 | +7 | -26 | 19 | 10 | -31 |
| 45D1 | -32 | 0 | -32 | 0 | 32 | 0 |
| 45D2 | -31 | -7 | -26 | -19 | -10 | 31 |
| 45D3 | -29 | -13 | -10 | -31 | -26 | 19 |
| 45D4 | -26 | -19 | 10 | -31 | -26 | -19 |
| 45D5 | -21 | -24 | 26 | -19 | 10 | -31 |
| 45E1 | -16 | -28 | 32 | 0 | 32 | 0 |
| 45E2 | -10 | -31 | 26 | 19 | -10 | 31 |
| 45E3 | -3 | -32 | 10 | 31 | -26 | 19 |
| 45E4 | 3 | -32 | -10 | 31 | -26 | -19 |
| 45E5 | 10 | -31 | -26 | 19 | 10 | -31 |
| 45F1 | 16 | -28 | -32 | 0 | 32 | 0 |
| 45F2 | 21 | -24 | -26 | -19 | -10 | 31 |
| 45F3 | 26 | -19 | -10 | -31 | -26 | 19 |
| 45F4 | 29 | -13 | 10 | -31 | -26 | -19 |
| 45F5 | 31 | -7 | 26 | -19 | 10 | -31 |

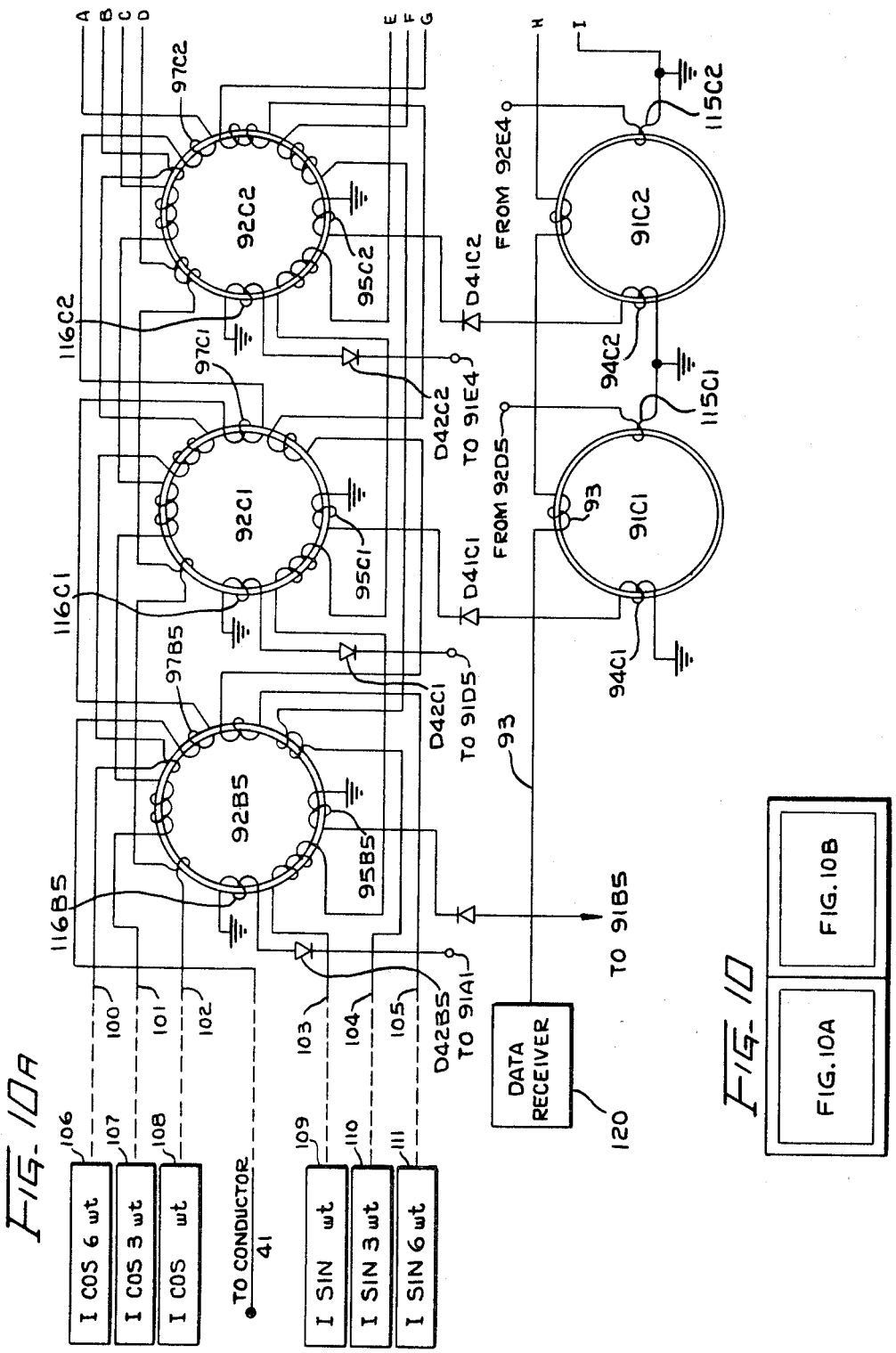

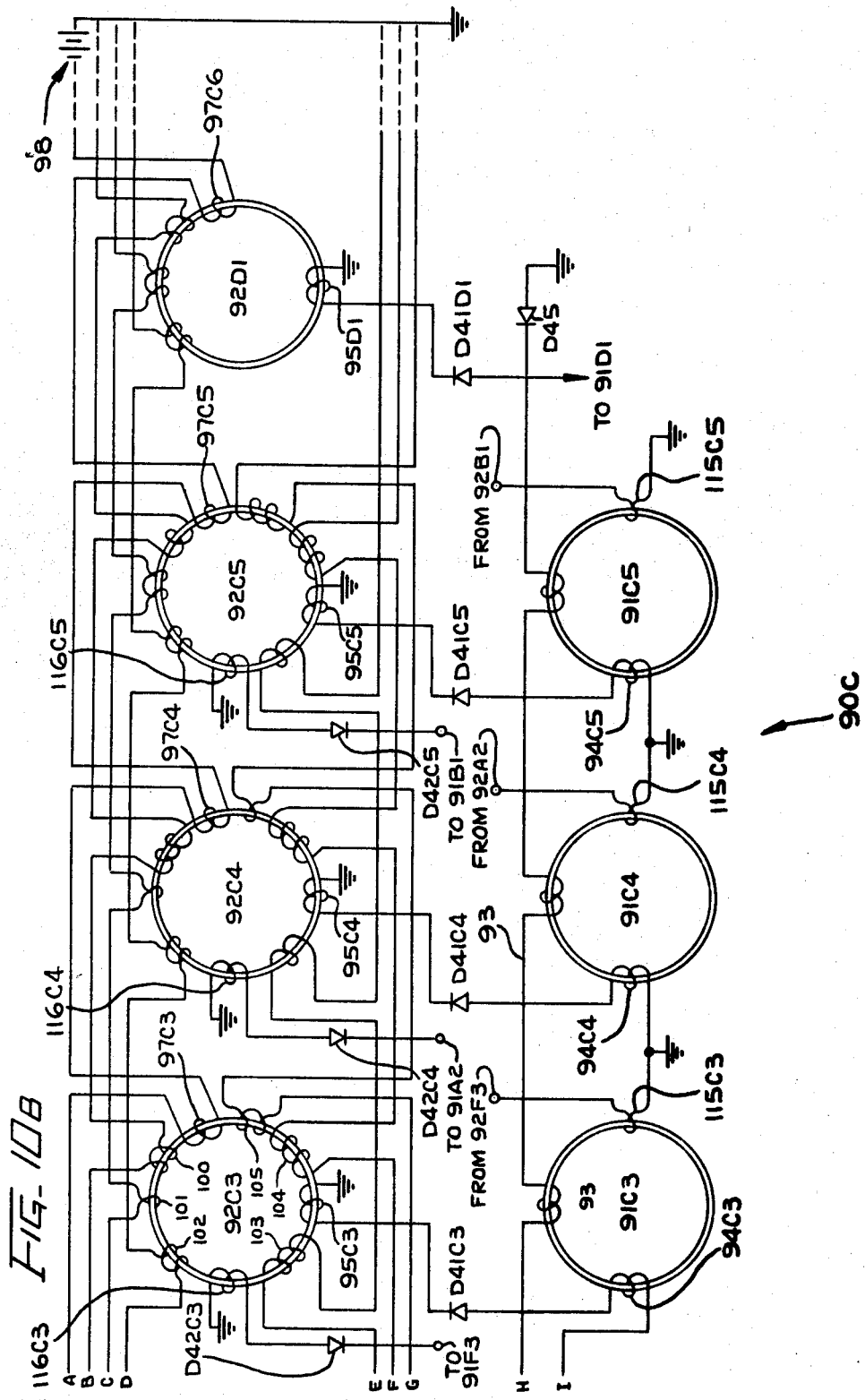

United States Patent Office 3,395,250
Patented July 30, 1968

3,395,250
MULTIPLEX TRANSMISSION SYSTEM INCLUDING SEQUENTIAL PULSING CIRCUITRY
Dallas H. Lien, Indianapolis, Ind., assignor to Western Electric Company, Incorporated, New York, N.Y., a corporation of New York
Original application May 2, 1962, Ser. No. 191,840, now Patent No. 3,280,335, dated Oct. 18, 1966. Divided and this application July 12, 1966, Ser. No. 574,518
24 Claims. (Cl. 179—15)

The present application is a division of copending application Serial No. 191,840, filed May 2, 1962 now U.S. Patent No. 3,280,335, issued Oct. 18, 1966.

This invention relates to multiplex transmission systems including sequential pulsing circuitry, and more specifically to transmission systems for transforming a plurality of independent data bits from a plurality of independent data sources to a series of time related data bits which are transmitted over a single transmission line and for subsequently transforming the series of time related data bits into a plurality of independent data bits which are transmitted to a receiving circuit. Accordingly, objects of this invention are to provide new and improved transmission systems of such character.

In the transmission of data bits, it is often desirable to transform a plurality of independent data bits which are provided by a plurality of independent data sources into a series of time related data bits which may be transmitted over a single transmission line and then to transform the series of time related data bits into a plurality of independent data bits which may be transmitted to a plurality of independent receivers. Another object of this invention is to provide a transmission system which may be preconditioned to perform either of these functions.

Another object of this invention is to provide an improved transmission system for independently storing input data bits in a first plurality of memory devices while data bits previously stored in a second plurality of memory devices are sequentially read out to form a series of time related data bits.

An additional object of this invention is to provide an improved transmission system for sequentially storing a plurality of independent data bits in a first plurality of memory devices while data bits previously stored in a second plurality of memory devices are sequentially read out to form a series of time related data bits.

A further object of this invention is to provide an improved composite transmission system for sequentially reading out previously stored data bits from a plurality of transmission systems to form a series of time related data bits while data bits are being stored independently in each transmission system.

Still another object of this invention is to provide an improved transmission system for receiving a series of time related data bits and sequentially storing the time related data bits in a first plurality of memory devices while data bits previously stored in a second plurality of memory devices are independently read out.

An additional object of this invention is to provide an improved composite transmission system for receiving a series of time related data bits and sequentially storing the time related data bits in a plurality of transmission systems while previously stored data bits are being independently read out in each transmission system.

Another object of this invention is to provide a multiplex transmission system for multiplexing a plurality of unsynchronized data sources.

A still further object of this invention is to provide improved circuits for sequentially inducing flux change pulses in succeeding ones of a plurality of magnetic components, which sequential pulsing circuits are especially useful as a part of the subject multiplex transmission systems.

With these and other objects in mind, the present invention relates primarily to a transmission system for transforming a plurality of independent data bits into a series of time related data bits. A plurality of data sources and a storing control circuit are alternately associated with two sets of a plurality of bistable memory devices while an output conductor and a read out control circuit are associated with the set of memory devices not associated with the data sources and the storing control circuit. The storing control circuit is responsive to input data bits produced by the data sources and causes selected memory devices within an associated set to be driven from primary stable states to secondary stable states to store data bits representative of the input data bits. The read out control circuit operates concomitantly with the storing control circuit and causes the memory devices within an associated set which have attained the secondary stable states to be sequentially driven to the primary stable states so that a series of time related data bits representative of previously stored data bits are induced in the output conductor.

The present invention also relates to a transmission system for transforming a series of time related data bits into a plurality of independent data bits, which system is preferably utilized in conjunction with the transmission system for transforming the plurality of independent data bits into a series of time related data bits.

Additionally, the present invention also relates to apparatus for sequentially inducing flux change pulses in succeeding ones of a plurality of magnetic components, which apparatus is preferably utilized in conjunction with the transmission system for transforming the plurality of independent data bits into a series of time related data bits. The apparatus consists of a plurality of control windings having prescribed winding patterns to which are applied control signals having prescribed polarities, frequencies, and amplitudes.

Other objects, advantages, and features of the invention will become apparent by reference to the following detailed description and the accompanying drawings which illustrate preferred embodiments thereof, in which:

FIG. 1 depicts the manner in which FIGS. 1A and 1B are to be connected to form a schematic diagram of a multiplex transmission system illustrating a first embodiment of the invention;

FIG. 2 depicts the manner in which FIGS. 2A and 2B are to be connected to form a detached schematic diagram illustrating a winding pattern of a pair of control windings for controlling the storing and reading out operations of the multiplex transmission system illustrated in FIGS. 1A and 1B;

FIG. 3 is a block diagram illustrating the connections of a pluarility of transmitting and receiving multiplex transmission systems of a second embodiment of the invention to a single conductor;

FIG. 4 depicts the manner in which FIGS. 4A, 4B, and 4C are to be connected to form a schematic diagram of one of the transmitting multiplex transmission systems illustrated in block form in FIG. 3, illustrating a transmitting portion of a second embodiment of the invention;

FIG. 5 is a detached schematic diagram illustrating a winding pattern of three storing control windings for sequentially inducing flux change pulses in magnetic components of the multiplex transmission system illustrated in FIGS. 4A, 4B, and 4C;

FIG. 6 is a detached schematic diagram illustrating a second storing control winding embodiment for the multiplex transmission system illustrated in FIGS. 4A, 4B, and 4C, wherein three binary control windings are utilized;

FIG. 7 depicts the manner in which FIGS. 7A and 7B are to be connected to form a detached schematic diagram illustrating a third storing control winding embodiment for the multiplex transmission system illustrated in FIGS. 4A, 4B, and 4C, wherein a plurality of sinusoidal and cosinusoidal control windings are utilized;

FIG. 8 is an enlarged view of a flux change pulse induced in a magnetic component of the multiplex transmission system illustrated in FIGS. 4A, 4B, and 4C by the control winding embodiment illustrated in FIGS. 7A and 7B;

FIG. 9 is a table depicting the number of turns of read out control windings wound on read out reactor cores of all the transmitting multiplex transmission systems illustrated in block form in FIG. 3;

Figure 2A:
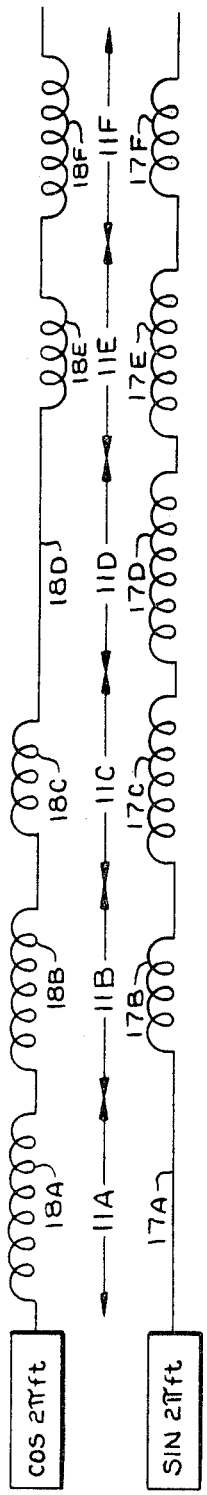

FIG. 10 depicts the manner in which FIGS. 10A and 10B are to be connected to form a schematic diagram of one of the receiving multiplex transmission systems illustrated in block form in FIG. 3, illustrating a receiving portion of the second embodiment of the invention; and FIG. 11 is a table depicting the eletcromagnetic association for read out of input reactor cores and memory devices of all the receiving multiplex transmission systems illustrated in block form in FIG. 3.

FIRST MULTIPLEX TRANSMISSION SYSTEM EMBODIMENT

Referring now in detail to the drawings and more specifically of FIGS. 1A and 1B, a simplified form of a multiplex transmission system 10 is illustrated in accordance with a first embodiment of the invention. The multiplex transmission system 10 may be used either (1) to transform a plurality of independent binary digit data signals into a series of time related binary digit data signals or (2) to transform a series of time related binary digit data signals into a plurality of independent binary digit data signals. For brevity, the binary digit data signals will be referred to as data bits in the following description of the invention.

The manner in which the multiplex transmission system 10 functions when transforming a plurality of independent data bits into a series of time related data bits will first be described under the heading "Parallel to Series Transformation" and then the manner in which the multiplex transmission system 10 functions when transforming a series of time related data bits into a plurality of independent data bits will be described under the heading "Series to Parallel Transformation."

Parallel to series transformation

The multiplex transmission system 10 includes a plurality of ring type magnetic memory devices 11A–11F (FIG. 1A) and 12A–12F (FIG. 1B) which are composed of a material having a nearly rectangular hysteresis loop, such as magnesium-manganese ferrite, copper-manganese ferrite, or tape wound 4–79 Permalloy (1 mil or thinner tape; Permalloy composition—4 parts Mo, 79 parts Ni, remainder iron and impurities), so that each memory device has a primary stable state (negative saturation) and a secondary stable state (positive saturation). More specifically, the memory devices are bistable and are incapable of assuming any other states of magnetization. A memory device may be driven from one stable state to the other stable state only when an input magnetizing force is applied thereto which corresponds in amplitude to the coercive force of the memory device. A magnetizing force less than that required to drive a memory device from one stable state to the other stable state will urge the memory device toward the other stable state but will have no resultant effect thereon and the memory device will remain in the original stable state. A flux change pulse is induced in a memory device only when the memory device is driven from one stable state to the other stable state.

The memory devices are divided into two sets of six memory devices 11A–11F and 12A–12F so that, during operation of the transmission system, six independent data sources and receivers 13A–13F, wherein input data bits are generated during the parallel to series transformation, are alternately associated electromagnetically with the two sets of memory devices while an output conductor 14 (FIG. 1B) is associated electromagnetically with the set of memory devices not associated with the data sources and receivers, to permit data bits representative of input data bits to be stored in one set while previously stored data bits are read out from the other set.

Each memory device 11A–11F and 12A–12F has an electrically independent input winding 15A–15F and 16A–16F wound thereon so as to be electromagnetically associated therewith and each input winding 15A–15F and 16A–16F has the same number of turns. During the first half of each cycle of operation, a switching circuit 26 (FIG. 1A) operates to connect the input windings 15A–15F on the memory devices 11A–11F in series with the data sources and receivers 13A–13F and, during the second half of each cycle of operation, the switching circuit 26 operates to connect the input windings 16A–16F on the memory devices 12A–12F in series with the data sources and receivers 13A–13F. The design and operation of the switching circuit 26 are set forth in detail hereinafter.

The memory device 11A–11F and 12A–12F are preconditioned so that, at the beginning of a transmission operation, they are all in the primary stable states. When one of the data sources and receivers 13A–13F is connected in series with one of the input windings within one of the groups 15A–15F or 16A–16F and an input data bit is generated in the data source and receiver, a positive magnetizing force is applied to the associated one of the memory devices within one of the sets 11A–11F or 12A–12F and urges the memory device toward the secondary stable state. Input data bits may be generated in selected ones of the data sources and receivers 13A–13F so that magnetizing forces are applied only to selected ones of the associated memory devices 11A–11F or 12A–12F, and the input data bits generated in the data sources and receivers 13A–13F are limited in amplitudes so that the magnetizing forces applied thereto which act upon the associated memory devices 11A–11F or 12A–12F do not have sufficient amplitudes to drive the memory devices from the primary stable states to the secondary stable states.

Since the selected memory devices must be driven from the primary stable states to the secondary stable states to store data bits representative of the input data bits generated by selected ones of the data sources and receivers 13A–13F, additional positive magnetizing forces must be applied to the selected memory devices which combine with the positive magnetizing forces applied thereto by the input data bits to drive the selected memory devices to the secondary stable states. A pair of control windings 17 and 18 are wound about the memory devices 11A–11F and 12A–12F so as to be electromagnetically associated therewith and control signals are applied to the control windings 17 and 18 from a pair of control signal generators 19 and 20 (FIG. 1A) to provide the additional magnetizing forces required to drive the selected memory devices to the secondary stable states.

The control windings 17 and 18 have periodic characteristics variations in the winding patterns which are distinct from but bear a predetermined relationship to each other so that a different combination of winding patterns of the control windings is established on each of the memory devices 11A–11F nad 12A–12F. The control signals generated by the control signal generators 19 and 20 and applied to the control windings 17 and 18 have polarities, frequencies, and amplitudes which are determined by the winding patterns so that (1) during the first half of each cycle of operation, maximum positive magnetizing forces are sequentially applied thereby to succeeding ones of the memory devices 11A–11F while maximum negative magnetizing forces are sequentially applied thereby to succeeding ones of the memory devices 12A–12F (some of which have attained the secondary stable states); and (2) during the second half of each cycle of operation, maximum positive magnetizing forces are sequentially applied thereby to succeeding ones of the memory devices 12A–12F while maximum negative magnetizing forces are sequentially applied thereby to succeeding ones of the memory devices 11A–11F (some of which have attained the secondary stable states).

The control signal amplitudes are so selected that the maximum magnetizing forces applied thereby to the memory devices do not have sufficient amplitudes to drive the memory devices from one stable state to the other stable state. However, the amplitudes of the input data bits and the control signals are so selected that the cumulative effects of the positive magnetizing forces produced by the input data bits and the maximum positive magnetizing forces produced by the control signals are sufficient in amplitude to drive the selected memory devices from the primary stable states to the secondary stable states.

Thus, during the first half of each cycle of operation, selected ones of the memory devices 11A–11F which have magnetizing forces applied thereto by input data bits are sequentially driven from the primary stable states to the secondary stable states to store data bits representative of the input data bits and, during the second half of each cycle of operation, selected ones of the memory devices 12A–12F which have magnetizing forces applied thereto by input data bits are sequentially driven from the primary stable states to the secondary stable states to store data bits representative of the input data bits.

Each memory device 11A–11F and 12A–12F also has (1) a bias winding 21A–21F and 22A–22F and (2) an output winding 23A–23F and 24A–24F wound thereon so as to be electromagnetically associated therewith. Each of the bias windings has the same number of turns and each of the output windings has the same number of turns. The bias windings 21A–21F are connected to form a series arrangement, the bias windings 22A–22F are connected to form a series arrangement, the output windings 23A–23F are connected to form a series arrangement, and the output windings 24A–24F are connected to form a series arrangement.

During the first half of each cycle of operation, the previously mentioned switching circuit 26 operates to connect the series arrangement of the output windings 24A–24F in series with the output conductor 14 and, during the second half of each cycle of operation, the switching circuit 26 operates to connect the series arrangement of the output windings 23A–23F in series with the output conductor 14.

A biasing and switching signal generator 25 (FIG. 1A) is provided for generating a square wave output signal which acts as both a biasing signal and a switching signal during the parallel to series transformation. A second generator 27 (FIG. 1A) is utilized only during the series to parallel transformation to be described hereinafter, and may be disregarded for the present description. The biasing and switching signal generator 25 is connected to the series arrangements of the bias windings 21A–21F and 22A–22F through a pair of diodes D1 and D2 and is connected directly to the switching circuit 26 as set forth below. A center ground resistor CGR is connected across output terminals 25A and 25B of the biasing and switching signal generator 25 so that (1) when the output thereof has a positive polarity, the first terminal 25A is positive and the second terminal 25B is negative and (2) when the output thereof has a negative polarity, the first terminal 25A is negative and the second terminal 25B is positive.

The biasing and switching signal generator 25 is operated in timed relationship with respect to the control signal generators 19 and 20 so that, during the first half of each cycle of operation, the output thereof has a negative polarity and, during the second half of each cycle of operation, the output thereof has a positive polarity. The diodes D1 and D2 are so arranged that, when the output signal of the biasing and switching signal generator has a negative polarity and the first terminal 25A is negative, a biasing signal is applied to the series arrangement of the bias windings 22A–22F and, when the output signal of the biasing and switching signal generator has a positive polarity and the second terminal 25B is negative, a biasing signal is applied to the series arrangement of the bias windings 21A–21F. Negative magnetizing forces are applied to the associated memory devices 11A–11F or 12A–12F which have attained the secondary stable states, when the biasing signal is applied to the bias windings 21A–21F or 22A–22F, and the negative magnetizing forces urge the memory devices toward the primary stable states.

The biasing signal generated by the biasing and switching signal generator 25 has a limited amplitude so that magnetizing forces applied to the associated memory devices 11A—11F or 12A–12F which have assumed the secondary stable states do not have sufficient amplitudes to drive the memory devices to the primary stable states. However, the amplitude of the biasing signal is so selected that the cumulative effects of the negative magnetizing forces produced by the biasing signal and the maximum negative magnetizing forces produced by the control signals, as discussed previously, are sufficient in amplitude to drive the memory devices from the secondary stable states to the primary stable states.

Thus, during the first half of each cycle of operation, negative magnetizing forces are applied to the memory devices 12A–12F which have attained the secondary stable states by the biasing signal and maximum negative magnetizing forces are sequentially applied to succeeding ones of the memory devices 12A–12F by the control signals so that the memory devices 12A–12F which have attained the secondary stable states are sequentially driven to the primary stable states and flux change pulses are induced therein. Since the series arrangement of the output windings 24A–24F on the memory devices 12A–12F is connected in series with the output conductor 14 during the first half of each cycle of operation, a series of time related output data bits representative of the stored data bits are sequentially induced in the output conductor 14 by the flux change pulses induced in the memory devices.

During the second half of each cycle of operation, negative magnetizing forces are applied to the memory devices 11A–11F by the biasing signal and maximum negative magnetizing forces are sequentially applied to succeeding ones of the memory devices 11A–11F by the control signals so that the memory devices 11A–11F which have attained the secondary stable states are sequentially driven to the primary stable states and flux change pulses are induced therein. Since the series arrangement of the output windings 23A–23F of the memory devices 11A–11F is connected in series with the output conductor 14 during the second half of each cycle of operation, a series of time related output data bits representative of the stored data bits is induced in the output conductor 14 by the flux change pulses induced in the memory devices.

Each series of time related output data bits induced in the output conductor 14 by operation of the transmission system 10 may be transmitted over the output conductor 14 to a similar multiplex transmission system wherein they are transformed from a series of time related data bits to a plurality of independent data bits which are transmitted to a plurality of independent data sources and receivers that are then used as receivers. The utilization of the transmission system 10 for receiving a series of time related data bits and transforming them into a plurality of independent data bits is set forth below under the heading "Series to Parallel Transformation."

*Switching circuit 26*

The above-mentioned switching circuit 26 (FIG. 1A)

is provided to perform the necessary switching operations for the transmission system 10. The switching circuit operates in response to the output of the biasing and switching signal generator 25 and since the biasing and switching signal generator 25 is operated in timed relationship with respect to the control signal generators 19 and 20, the switching circuit 26 is operated in timed relationship with respect to the outputs of the control signal generators.

During the first half of each cycle of operation, the switching circuit 26 operates in response to the negative output signal of the biasing and switching signal generator 25 (1) to connect the data sources and receivers 13A–13F in series with the input windings 15A–15F on the memory devices 11A–11F and (2) to connect the output conductor 14 in series with the series arrangement of the output windings 24A–24F on the memory devices 12A–12F. During the second half of each cycle of operation, the switching circuit 26 operates in response to the positive output of the biasing and switching signal generator 25 (1) to connect the data sources and receivers 13A–13F in series with the input windings 16A–16F on the memory devices 12A–12F and (2) to connect the output conductor 14 in series with the series arrangement of the output windings 23A–23F on the memory devices 11A–11F.

The switching circuit 26 includes four transistors T1–T4. Two of the transistors T1 and T2 operate as output ground switches for connecting one of the series arrangements of output windings 23A–23F or 24A–24F in series with the output conductor 14, and two of the transistors T3 and T4 operate as input ground switches for connecting the input windings 15A–15F or 16A–16F in series with the data sources and receivers 13A–13F.

The emitters of all the transistors T1–T4 are connected to ground, the collector of the transistor T1 is connected to one side of the series arrangement of the output windings 23A–23F, the collector of the transistor T2 is connected to one side of the series arrangement of the output windings 24A–24F, the collector of the transistor T3 is connected to one side of all the input windings 15A–15F, and the collector of the transistor T4 is connected to one side of all the input windings 16A–16F.

The bases of the transistors T2 and T3 are connected together and are connected to the second output terminal 25B of the biasing and switching signal generator 25 so that, when the output of the biasing and switching signal generator 25 is negative, during the first half of each cycle of operation, the terminal 25B is positive and the transistors T2 and T3 conduct (1) to complete the series connection between the output conductor 14 and the series arrangement of the output windings 24A–24F and (2) to complete the series connection between the data sources and receivers 13A–13F and the input windings 15A–15F. The bases of the transistors T1 and T4 are connected together and are connected to the first output terminal 25A of the biasing and switching signal generator 25 so that, when the output of the biasing and switching signal generator 25 is positive, during the second half of each cycle of operation, the terminal 25A is positive and the transistors T1 and T4 conduct (1) to complete the series connection between the output conductor 14 and the series arrangement of the output windings 23A–23F and (2) to complete the series connection between the data sources and receivers 13A–13F and the input windings 16A–16F.

*Control windings 17 and 18*

Figure 2B:
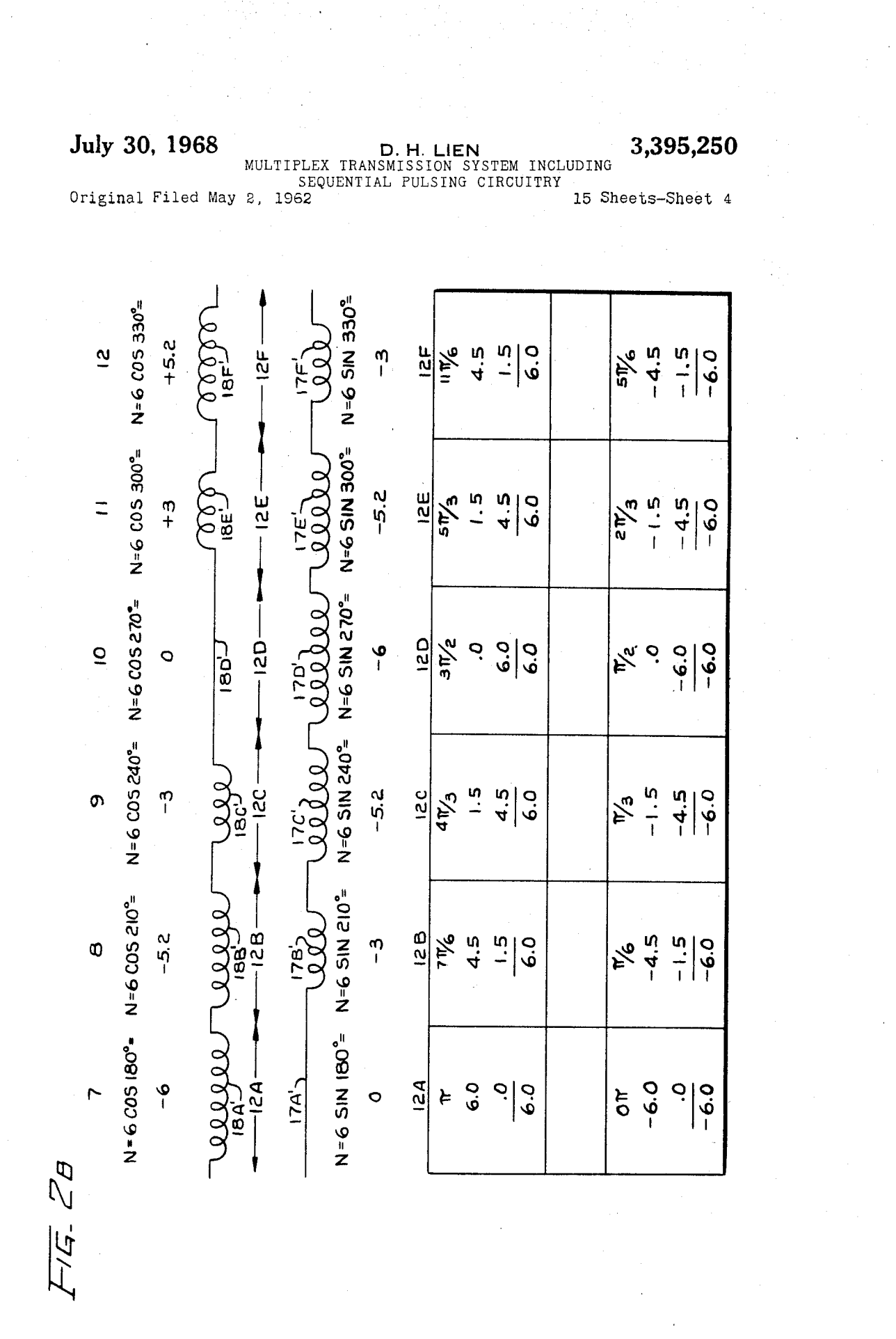

The control windings 17 and 18 are illustrated in detached side-by-side relationship in FIGS. 2A and 2B so that the operation of the invention may be depicted more clearly. As illustrated, the control windings have periodic characteristic variations so that a different combination of winding patterns of the control windings is established on each of the memory devices 11A–11F and 12A–12F.

The first control winding 17 is wound on the memory devices in a sinusoidal winding pattern so that the number of turns $N_{sin}$ wound on each memory device is determined by the following equation:

$$N_{sin} = N_{max} \sin 2\pi x/n = 6 \sin \theta$$

wherein $N_{max}$ is an arbitrary constant designating the maximum number of turns (chosen as 6 in the illustrated embodiment), $x$ is the number of the particular memory device (the memory devices being sequentially numbered from 0 to 11 so that the memory devices 11A–11F are numbered from 0 to 5 and the memory devices 12A–12F are numbered from 6 to 11), $n$ is the total number of memory devices (chosen as 12 in the illustrated embodiment), and $\theta$ is substituted for $2\pi x/n$ and is the angular interval for the particular memory device (substituting in values of $x$ and $n$, $\theta$ varies in 30° intervals from 0° to 330°).

By solving the equation set forth above for the sine control winding 17, the number of turns of the sine control winding 17 associated with the memory device 11A is 0 turns since $N_{sin} = 6 \sin 0°$ and the sine of 0° is 0. The number of turns of the sine control winding 17 associated with the memory device 11B is three turns in the first hand or positive direction since $N_{sin} = 6 \sin 30°$ and the sine of 30° is .5. Similarly, the number of turns of the sine control winding associated with each succeeding memory device 11C–11F and 12A–12F may be determined by solving the above-mentioned equation so that the number of turns set forth in FIGS. 2A and 2B are provided.

The second control winding 18 is wound on the memory device in a cosinusoidal winding pattern so that the number of turns $N_{cos}$ wound on each memory device is determined by the following equation:

$$N_{cos} N_{max} \cos 2\pi x/n = 6 \cos \theta$$

By solving this equation for the cosine control winding 18, the number of turns of the cosine control winding 18 associated with the memory device 11A is six turns in the first hand or positive direction since $N = \delta \cos 0°$ and the cosine of 0° is 1. The number of turns of the cosine control winding 18 associated with the memory device 11B is approximately 5.2 turns in the first hand or positive direction since $N = 6 \cos 30°$ and the cosine of 30° is 0.866. Similarly, the number of turns of the cosine control winding associated with each succeeding memory device 11C–11F and 12A–12F may be determined by solving the above-mentioned equation so that the number of turns set forth in FIGS. 2A and 2B are provided.

The pair of control signal generators 19 and 20 apply control signals to the control windings 17 and 18 which also vary according to sinusoidal and cosinusoidal functions. The first control signal generator 19 applies a sinusoidal control signal to the sinusoidal control winding 17 which varies according to the equation $$I_{sin} = I_{max} \sin 2\pi ft = \sin 2\pi ft$$

and the second control signal generator 20 applies a consinusoidal control signal to the consinusoidal control winding 18 which varies according to the equation $$I_{cos} = I_{max} \cos 2\pi ft = \cos 2\pi ft$$

wherein $f$ is frequency, $t$ is time, and $I_{max}$ is an arbitrary constant designated as the maximum value of the control signals generated by the control signal generators 19 and 20 (chosen as 1 in the illustrated embodiment).

The magnetizing energy $H_{sin}$ supplied to a memory device by applying the sine control signal to the sine control winding 17 is determined by the following equation:

$$H_{sin} = (I_{sin})(N_{sin}) = (I_{max} \sin 2\pi ft)(N_{max} \sin 2x/n) = (\sin 2\pi ft)(6 \sin 2\pi x/12)$$

and the magnetizing energy $H_{cos}$ supplied to a memory device by applying the cosine control to the cosine control winding, 18 is determined by the following equation:

$$H_{cos} = (I_{cos})(N_{cos}) = (I_{max} \cos 2\pi ft)(N_{max} \cos 2\pi x/n) = (\cos 2\pi ft)(6 \cos 2\pi x/12)$$

Therefore, the total magnetizing energy supplied to a memory device at any given time is determined by the following equation:

$$H_{total} = (\sin 2\pi ft)(6 \sin 2\pi x/12) + \cos 2\pi ft)(6 \cos 2\pi x/12)$$

and this equation may be solved by the trigonometric identity $$\cos(A-B) = \sin A \sin B + \cos A \cos B$$

so that $$H_{total} = 6 \cos[2\pi(x/12 - ft)]$$

The above total magnetizing energy equation illustrates that the total magnetizing energy is a maximum when $(x/12 - ft) = 0, 1, 2, 3 \ldots$. Since time moves forward at a constant rate, the maximum magnetizing energy sequentially shifts from one memory device to the next at a constant rate. It should also be noted that maximum positive magnetizing energy and a maximum negative magnetizing energy are provided by the total magnetizing energy equation since the equation varies according to a cosine function and the above total magnetizing energy cosine function $6 \cos[2\pi(x/12 - ft)]$ has a maximum positive value when $2\pi(x/12 - ft)$ equals an even integral multiple of $\pi$ and has a maximum negative value when $2\pi(x/12 - ft)$ equals an odd integral multiple of $\pi$. The maximum magnetizing energies are $\pi$ (or 180°) out of phase with respect to each other so that while one memory device has a maximum positive magnetizing force applied thereto by the maximum positive magnetizing energy, another memory device, six intervals removed therefrom, has a maximum negative magnetizing force applied thereto by the maximum negative magnetizing energy.

The relationship of the maximum magnetizing energies with respect to the memory devices 11A–11F and 12A–12F is illustrated in FIGS. 2A and 2B as the value of $2\pi ft$ is varied in $\pi/6$ (or 30°) intervals between $0\pi$ and $11\pi/6$. As previously set forth, the magnetizing energy induced by applying the sine control signal to the sine control winding 17 is equal to $(N_{sin})(\sin 2\pi ft)$ and the magnetizing energy induced by applying the cosine control signal to the cosine control winding 18 is equal to $(N_{cos})(\cos 2\pi ft)$. In the illustrated example, the maximum cumulative magnetizing energies are equal to 6 and the mathematical solutions for the sequential inducing thereof are set forth below.

When $2\pi ft = 0\pi$ or 0°: (1) the energy induced adjacent the memory device 11A has a maximum positive value since $H_{cos} = 6 \times \cos 0° = 6 \times 1 = +6$ and $$H_{sin} = 0 \times \sin 0° = 0$$

so that $H_{total} = 6 + 0 = +6$ and (2) the energy induced adjacent the memory device 12A has a maximum negative value since $H_{cos} = -6 \times \cos 0° = -6 \times 1 = -6$ and $$H_{sin} 0 \times \sin 0° = 0$$

so that $H_{total} = (-6) + (0) = -6$. When $2\pi ft = (\pi/6)$ or (30°): (1) the energy induced adjacent the memory device 11B has a maximum positive value since $$H_{cos} = 5.2 \times \cos 30° = 5.2 \times .866 = 4.5$$

and $H_{sin} = 3 \times \sin 30° = 3 \times .5 = +1.5$ so that $$H_{total} = 4.5 + 1.5 = 6$$

and (2) the energy induced adjacent the memory device 12B has a maximum negative value since $$H_{cos} = -5.2 \times \cos 30° = -5.2 \times .866 = -4.5$$

and $H_{sin} = -3 \times \sin 30° = -3 \times .5 = -1.5$ so that $$H_{total} = (-4.5) + (-1.5) = -6$$

Similarly, as $2\pi ft$ increases in $\pi/6$ or 30° intervals, the maximum positive and negative magnetizing energies are sequentially induced adjacent succeeding ones of the memory devices 11A–11F and 12A–12F. Maximum negative magnetizing energies are sequentially induced adjacent succeeding ones of the memory devices 12A–12F as maximum positive magnetizing energies are sequentially induced adjacent succeeding ones of the memory devices 11A–11F and vice versa.

The control windings 17 and 18 are so wound that only the maximum positive magnetizing forces produced by applying the control signals to the control windings have sufficient amplitudes to combine with magnetizing forces produced by input data bits to drive selected ones of the memory devices 11A–11F and 12A–12F from the primary stable states to the secondary stable states so that flux change pulses are induced therein and that only the maximum negative magnetizing forces produced by applying the control signals to the control windings have sufficient amplitudes when combined with the magnetizing forces produced by the biasing signal to drive the memory devices 11A–11F and 12A–12F which have assumed the secondary stable states to the primary stable states so that flux change pulses are induced therein.

During the first half of each cycle of operation, maximum positive magnetizing forces are sequentially applied to the memory devices 11A–11F by the control signals which combine with magnetizing forces applied to selected ones of the memory devices 11A–11F by input data bits to sequentially drive the selected memory devices from the primary stable states to the secondary stable states. Also, during the first half of each cycle of operation, maximum negative magnetizing forces are sequentially applied to the memory devices 12A–12F and the maximum negative magnetizing forces combine with the negative magnetizing forces applied thereto by the biasing signal to sequentially drive the memory devices 12A–12F which have attained the secondary stable states to the primary stable states.

During the second half of each cycle of operation, maximum positive magnetizing forces are sequentially applied to the memory devices 12A–12F by the control signals which combine with magnetizing forces applied to selected ones of the memory devices 12A–12F by input data bits to sequentially drive the selected memory devices from the primary stable states to the secondary stable states. Also, during the second half of each cycle of operation, maximum negative magnetizing forces are sequentially applied to the memory devices 11A–11F and the maximum negative magnetizing forces combine with the negative magnetizing forces applied thereto by the biasing signal to sequentially drive the memory devices 11A–11F which have attained the secondary stable states to the primary stable states.

*Series to parallel transformation*

During series to parallel transformation, the multiplex transmission system 10 (FIGS. 1A and 1B) operates similarly to its operation during parallel to series transformation. However, the transmission system 10 must be conditioned for series to parallel transformation by energizing a pair of relays R1 and R2 (FIG. 1A). The relays R1 and R2 are energized by closing a switch SW1 so that the DC energizing potential from the source 28 is applied to the relays.

When relay R1 is energized, the contact arms R1A and R1B are moved from the primary contact terminals to the secondary contact terminals so that the previously mentioned biasing and switching signal generator 27 is connected in the transmission system 10 in place of the biasing and switching signal generator 25. The output signal generated by the biasing and switching signal generator 27 is one-half cycle out of phase with respect to the output signal generated by the biasing and switching generator 25 so that, during series to parallel transformation, the switching operations are one-half cycle out of phase with respect to the switching operations during parallel to series transformation.

Thus, during the first half of each cycle of operation, (1) the data sources and receivers 13A–13F are connected in series with the input windings 16A–16F on the memory devices 12A–12F, whereas in parallel to series transformation, the data sources and receivers 13A–13F were connected in series with the input windings 15A–15F on the memory devices 11A–11F and (2) the output conductor 14 is connected in series with the series arrangement of the output windings 23A–23F on the memory devices 11A–11F whereas in parallel to series transformation, the output conductor 14 was connected in series with the series arrangement of output windings 24A–24F on the memory devices 12A–12F.

During the second half of each cycle of operation, (1) the data sources and receivers 13A–13F are connected in series with the input windings 15A–15F on the memory devices 11A–11F, whereas in parallel to series transformation, the data sources and receivers 13A–13F were connected in series with the input windings 16A–16F on the memory devices 12A–12F and (2) the output conductor 14 is connected in series with the series arrangement of output windings 24A–24F on the memory devices 12A–12F, whereas in parallel to series transformation, the output conductor 14 was connected in series with the series arrangement of output windings 23A–23F on the memory devices 11A–11F.

In essence, during series to parallel transformation, the output conductor 14 becomes an input conductor, the output windings 23A–23F and 24A–24F become input windings, the input windings 15A–15F and 16A–16F become output windings, and the data sources and receivers 13A–13F become receivers.

When relay R2 is energized, the contact arms R2A and R2B are moved from the primary contact terminals to the secondary contact terminals so that the series arrangement of the bias windings 21A–21F is connected to the first output terminal 25A of the biasing and switching signal generator 27 and the series arrangement of the bias windings 22A–22F is connected to the second output terminal 25B of the biasing and switching signal generator 27. The biasing and switching signal generator 27 is operated in timed relationship with respect to the control signal generators 19 and 20 so that, during the first half of each cycle of operation, the output thereof has a positive polarity and, during the second half of each cycle of operation, the output thereof has a negative polarity. Thus, when the output signal has a negative polarity and the first terminal 25A is negative, the biasing signal is applied to the series arrangement of biasing windings 21A–21F and, when the output signal has a positive polarity and the second terminal 25B is negative, the biasing signal is applied to the series arrangement of biasing windings 22A–22F. Negative magnetizing forces are applied to the associated memory devices 11A–11F or 12A–12F which have attained the secondary stable states, when the biasing signal is applied to the bias windings 21A–21F or 22A–22F, and the negative magnetizing forces urge the memory devices toward the primary stable states.

The same control signal generators 19 and 20 are used during series to parallel transformation as were used during parallel to series transformation so that (1) during the first half of each cycle of operation, maximum positive magnetizing forces are sequentially applied thereby to succeeding ones of the memory devices 11A–11F while maximum negative magnetizing forces are sequentially applied thereby to succeeding ones of the memory devices 12A–12F and (2) during the second half of each cycle of operation, maximum positive magnetizing forces are sequentially applied thereby to succeeding ones of the memory devices 12A–12F while maximum negative magnetizing forces are sequentially applied thereby to succeeding ones of the memory devices 11A–11F.

As a series of time related input data bits are transmitted over the output conductor 14 which now acts as an input conductor, time related positive magnetizing forces are applied to the associated memory devices 11A–11F or 12A–12F. The magnetizing forces produced by the time related input data bits urge the associated memory devices 11A–11F or 12A–12F toward the secondary stable states but do not have sufficient amplitudes to drive the memory devices from the primary stable states to the secondary stable states. During the first half of each cycle of operation, the switching circuit 26 operates to connect the series arrangement of the output windings 23A–23F on the memory devices 11A–11F in series with the output conductor 14 so that positive magnetizing forces are applied to the memory devices 11A–11F by the time related input data bits and, during the second half of each cycle of operation, the switching circuit 26 operates to connect the series arrangement of the output windings 24A–24F on the memory devices 12A–12F in series with the output conductor 14 so that positive magnetizing forces are applied to the memory devices 12A–12F by the time related input data bits.

Since the series of time related input data bits were sequentially induced in the output conductor 14 during parallel to series transformation by control signals which were identical to the control signals used in this series to parallel transformation, magnetizing forces are sequentially applied by the time related input data bits to the associated memory devices 11A–11F or 12A–12F in timed relationship with respect to the sequential application of maximum positive magnetizing forces to the memory devices in response to the application of the control signals to the control windings 17 and 18. The cumulative effects of the maximum positive magnetizing forces produced by the control signals and the time related magnetizing forces produced by the time related input data bits are sufficient to drive the associated memory devices 11A–11F or 12A–12F from the primary stable states to the secondary stable states to store data bits therein which are representative of the input data bits.

Thus, during the first half of each cycle of operation, selected ones of the memory devices 11A–11F have positive magnetizing forces applied thereto by time related input data bits in timed relationship with respect to the sequential application of maximum positive magnetizing forces thereto by the control signals so that the selected memory devices are sequentially driven from the primary stable states to the secondary stable states. During the second half of each cycle of operation, selected ones of the memory devices 12A–12F have positive magnetizing forces applied thereto by time related input data bits in timed relationship with respect to the sequential application of maximum positive magnetizing forces thereto by the control signals so that the selected memory devices are sequentially driven from the primary stable states to the secondary stable states.

Also, during the first half of each cycle of operation, maximum negative magnetizing forces are sequentially applied to the memory devices 12A–12F and the maximum negative magnetizing forces combine with negative magnetizing forces applied to the memory devices 12A–12F by the biasing signal to drive the memory devices 12A–12F which have attained the secondary stable states to the primary stable states so that flux change pulses are induced therein. As the memory devices 12A–12F which have attained the secondary stable states are sequentially driven to the primary stable states, output data bits representative of the stored data bits are sequentially induced by the flux change pulses in the associated ones of the input windings 16A–16F, which act as output windings, and the output data bits are transmitted to the associated ones of the data sources and receivers 13A–13F, which act as receivers.

Also, during the second half of each cycle of operation, maximum negative magnetizing forces are sequentially applied to the memory devices 11A–11F and the maximum negative magnetizing forces combine with negative magnetizing forces applied to the memory devices 11A–11F by the biasing signal to drive the memory devices 11A–11F which have attained the secondary stable states to the primary stable states so that flux change pulses are induced therein. As the memory devices 11A–11F which have attained the secondary stable states are sequentially driven to the primary stable states, output data bits representative of the stored data bits are sequentially induced by the flux change pulses in the associated ones of the input windings 15A–15F, which act as output windings, and the output data bits are transmitted to the associated ones of the data sources and receivers 13A–13F, which act as receivers.

Thus it may be seen that the multiplex transmission system 10 illustrated in FIGS. 1A and 1B may be used to transform a plurality of independent data bits into a series of time related data bits or to transform a series of time related data bits into a plurality of independent data bits. By connecting transmission systems 10 on opposite ends of a conductor 14, data bits may be transmitted from a first plurality of data sources and receivers to a second plurality of associated data sources and receivers over a single transimssion line whereas an equal plurality of transformation lines would normally be required.

TRANSMITTER CIRCUIT FOR A SECOND MULTIPLEX TRANSMISSION SYSTEM EMBODIMENT

In many multiplex transmission operations (such as the transmission of data bits in a Teletype system), it is desirable to transmit a plurality of input data bits from a plurality of multiplex transmission systems 40A–40F of a transmitting circuit 40 over the same output conductor 41 as illustrated in block form in FIG. 3. Subsequently, the plurality of data bits transmitted over the output conductor 41 must be received by a plurality of multiplex receiving ssytems 90A–90F of a receiving circuit 90 as set forth below under the heading "Receiver Circuit for the Second Multiplex Transmission System Embodiment." In the illustrated embodiment, five input data bits from each of the six multiplex transmission systems 40A–40F are to be sequentially read out over the output conductor 41. In order for the system to operate properly, the thirty data bits from the six multiplex transmission systems 40A–40F must be sequentially read out in the time period required to store five data bits in each transmission system. One of the multiplex transmission systems 40A–40F, illustrated in block form in FIG. 3, is illustrated in simplified schematic form in FIGS. 4A, 4B, and 4C in accordance with a second embodiment of the invention.

The multiplex transmission system 40C illustrated in FIGS. 4A, 4B, and 4C includes a plurality of bistable ring type magnetic memory devices 42C1–42C5 and 43C1–43C5 (FIGS. 4B and 4C) which are composed of a material having a nearly rectangular hysteresis loop, such as the magnesium-manganese ferrite, copper-manganese ferrite, or tape wound 4–79 Permalloy (previously mentioned materials), so that each memory device has a primary stable state (negative saturation) and a secondary stable state (positive saturation), as described in conjunction with the first embodiment of the invention.

The memory devices are divided into two sets of five memory devices 42C1–42C5 (also called set I) and 43C1–43C5 (set II) so that, during operation of the transmission system, five storing reactor cores 44C1–44C5 (saturable cores), wherein flux change pulses representative of input data bits may be induced, are alternately associated electromagnetically with the two sets of memory devices (I and II) while five read out reactor cores 45C1–45C5 and an output conductor 41 are associated electromagnetically with the set of memory devices not associated with the storing reactor cores, to permit data bits representative of input data bits to be stored in one set while data bits representative of previously stored data bits are read out from the other set. A sixth reactor core 45C5 (start pulse reactor core) shown in FIG. 4A is provided to aid in controlling the operation of a switching circuit 49 as set forth below.

Each of the memory devices 42C1–42C5 and 43C1–43C5 has an electrically independent input winding 46C1–46C5 and 47C1–47C5 wound thereon so as to be electromagnetically associated therewith and each input winding 46C1–46C5 and 47C1–47C5 has the same number of turns. Each storing reactor core 44C1–44C5 has an electrically independent output winding 48C1–48C5 wound thereon so as to be electromagnetically associated therewith and each output winding 48C1–48C5 has the same number of turns. During the first half of each cycle of operation, the switching circuit 49 operates to connect the input windings 46C1–46C5 on the memory devices of set I to the output windings 48C1–48C5 on the storing reactor cores 44C1–44C5 through diodes D11–D15 so that the memory devices of set I are electromagnetically associated with the storing reactor cores 44C1–44C5. During the second half of each cycle of operation, the switching circuit 49 operates to connect the input windings 47C1–47C5 on the memory devices 43C1–43C5 of set II to the output windings 48C1–48C5 on the storing reactor cores 44C1–44C5 through the diodes D16–D20 so that the memory devices of set II are electromagnetically associated with the storing reactor cores 44C1–44C5. The design and operation of the switching circuit 49 are set forth in detail hereinafter.

When a storing reactor core is electromagnetically associated with a memory device and a flux change pulse is induced in the storing reactor core by an input data bit, a current pulse is induced in the series connection of the associated output winding on the storing reactor core and the associated input winding on the memory device which applies a magnetizing force to the memory device that urges the memory device toward the secondary stable state. If the fllux change pulse induced in the storing reactor core has a sufficient amplitude, the magnetizing force applied to the associated memory device will drive the memory device from the primary stable state to the secondary stable state. Thus, as flux change pulses of sufficient amplitudes are induced in selected ones of the storing reactor cores 44C1–44C5, selected ones of the associated memory devices 42C1–42C5 or 43C1–43C5 are driven from the primary stable states to the secondary stable states to store data bits representative of input data bits.

The diodes D11–D20 are provided so that the negative portions (tails) of the flux change pulses induced in the storing reactor cores 44C1–44C5 have no effect on the associated memory devices 42C1–42C5 or 43C1–43C5. As a flux change pulse induced in a storing reactor core rises from a base value to a value representative of an input data bit to be stored, a positive magnetizing force is applied to the associated memory device which drives the memory device from the primary stable state to the secondary stable state. As the flux change pulse induced in the storing reactor core decreases from the representative value to the base value, a negative magnetizing force would be applied to the memory device which would drive the memory device back to the primary stable state. However, the diodes D11–D20 are so arranged that current flows in the series connections of the output windings 48C1–48C5 on the storing reactor cores 44C1–44C5 and the input windings 46C1–46C5 or 47C1–47C5 on the memory devices 42C1–42C5 or 43C1–43C5 only when the flux change pulses induced in the storing reactor cores 44C1–44C5 rise from the base values to the representative values. Thus, the effect of the negative tails of the flux change pulses induced in the storing reactor cores are negated.

Each of the reactor cores 44CS and 44C1–44C5 has a bias winding 50CS and 50C1–50C5 wound thereon so as to be electromagnetically associated therewith and each bias winding 50C1–50C5 and 50CS has the same number of turns. The bias windings are connected to form a series arrangement which is connected to a source of negative DC potential 51 so that the reactor cores 44CS and 55C1–44C5 are normally biased beyond negative magnetic saturation.

A plurality of electrically independent control windings 52–54 (defining the windings 52CS and 52C1–52C5, 53CS and 53C1–53C5, and 54CS and 54C1–54C5) are wound about the reactor cores 44CS and 44C1–44C5 so as to be electromagnetically associated therewith. Control signal generators 55–57 are connected to the control windings 52–54 to apply control signals thereto which overcome the effect of the negative bias induced by application of the bias signal to the bias windings 50CS and 50C1–50C5 so that maximum flux change pulses are sequentially induced in succeeding ones of the reactor cores 44CS and 44C1–44C5 (from left to right as illustrated in FIGS. 4A, 4B, and 4C).

As will be described hereinafter, the control windings 52–54 have periodic characteristic variations in the winding pattern which are distinct from but bear a predetermined relationship to each other so that a different combination of winding patterns is established on each of the reactor cores 44CS and 44C1–44C5, as set forth below. The control signals applied to the control windings 52–54 have polarities, frequencies, and amplitudes which are determined by the winding patterns and the negative bias so that during each half cycle of operation, maximum positive flux change pulses are sequentially induced in succeeding ones of the reactor cores 44CS and 44C1–44C5. The control signal amplitudes are so selected that the maximum flux change pulses induced thereby in the reactor cores 44CS and 44C1–44C5 do not have sufficient amplitudes to apply magnetizing forces to the associated memory devices 42C1–42C5 or 43C1–43C5 of sets I or II which have sufficient amplitudes to drive the associated memory devices from the primary stable states to the secondary stable states.

In order to cause data bits representative of input data bits to be stored in selected ones of the associated memory devices 42C1–42C5 or 43C1–43C5, a data source 60 is connected to the series arrangement of the bias windings 50CS and 50C1–50C5 on the reactor cores 44CS and 44C1–44C5. First a "start" signal and then a series of time related input data bits are generated in the data source during each half cycle of operation.

The data souce 60 is also connected to the control signal generators 55–57 through a conventional blocking network 58 which only permits the first or "start" pulse to be transmitted to the control signal generators 55–57 whereby the control signals applied to the control windings 52–54 are placed to a prescribed timed relationship with respect to the start signal and the input data bits so that the negative bias on the reactor cores 44CS and 44C1–44C5 is reduced in a prescribed timed relationship with respect to the inducing of maximum positive flux change pulses in succeeding ones of the reactor cores 55CS and 44C1–44C5 by the control signals. The amplitudes of the input data bits generated by the data source 60 are so selected that the negative bias on the storing reactor cores 44C1–44C5 is sufficiently reduced thereby to permit flux change pulses to be induced in selected ones of the storing reactor cores 44C1–44C5 which have sufficient amplitudes to cause selected ones of the associated memory devices 42C1–42C5 or 43C1–43C5 to be driven from the primary stable states to the secondary stable states to store data bits representative of the input data bits.

Thus, during the first half of each cycle of operation, selected ones of the memory devices of set I are sequentially driven from the primary stable states to the secondary stable states and, during the second half of each cycle of operation, selected ones of the memory devices of set II are sequentially driven from the primary stable states to the secondary stable states.

The transmission system 40C may be modified by providing independent input windings on each of the storing reactor cores 44C1–44C5 and independently connecting a data source to each of the input windings so that input data bits may be independently applied thereto.

Each of the memory devices 42C1–42C5 and 43C1–43C5 also has an electrically independent output control winding 61C1–61C5 (set I) and 62C1–62C5 (set II) wound thereon so as to be electromagnetically associated therewith and each of the output control windings 61C1–61C5 and 62C1–62C5 has the same number of turns. Each read out reactor core 45C1–45C5 has an electrically independent output winding 65C1–65C5 wound thereon so as to be electromagnetically associated therewith and each output winding 65C1–65C5 has the same number of turns.

During the first half of each cycle of operation, the switching circuit 49 operates to connect the output control windings 62C1–62C5 on the set II memory devices 43C1–43C5 to the output windings 65C1–65C5 on the read out reactor cores 45C1–45C5 through diodes D21–D25 so that the memory devices 43C1–43C5 are electromagnetically associated with the read out reactor cores 45C1–45C5. During the second half of each cycle of operation, the switching circuit 49 operates to connect the output control windings 61C1–61C5 on the set I memory devices 42C1–42C5 in series with the output windings 65C1–65C5 on the read out reactor cores 45C1–45C5 through the diodes D26–D30 so that the memory devices 42C1–42C5 are electromagnetically associated with the read out reactor cores 45C1–45C5.

When a read out reactor cores is electromagnetically associated with a memory device and a flux change pulse is induced in the read out reactor core by a read out signal in a manner to be described, a current pulse is induced in the series connection of the associated output winding 65C1–65C5 on the read out reactor core and the associated output control winding 62C1–62C5 or 61C1–61C5 on the memory device which applies a negative magnetizing force to the memory device. If the flux change pulse induced in the read out reactor core has a sufficient amplitude, the negative magnetizing force applied to the associated memory device will drive the memory device from the secondary stable state to the primary stable state to induce a flux change pulse therein if the memory device had previously attained the secondary stable state. Thus as flux change pulses of sufficient amplitudes are sequentially induced in the read out reactor cores 45C1–45C5, the associated memory devices 42C1–42C5 or 43C1–43C5 which have attained the secondary stable states are sequentially driven to the primary stable states.

The diodes D21–D30 are provided so that the negative portions (tails) of the flux change pulses induced in the read out reactor cores 45C1–45C5 have no effect on the associated memory devices 42C1–42C5 or 43C1–43C5, as described hereinbefore with respect to the operation of the diodes D11–D20.

Referring to FIGS. 4A, 4B, and 4C, the read out reactor cores 45A1–45F5 of all the multiplex transmission systems 40A–40F illustrated in block form in FIG. 3 have a plurality of control windings 66–71 and a bias winding 72 (which define windings 66A1–66F5, 67A1–67F5, 68A1–68F5, 69A1–69F5, 70A1–70A5, 71A1–71F5, and 72A1–72F5) wound thereon so as to be electromagnetically associated therewith. The windings for the last reactor core 45B5 of system B and all five reactor cores 45C1–45C5 of system C being shown, and the windings on the remainder of the reactor cores being omitted and indicated by the dashed lines at the left of FIG. 4A and at the right of FIG. 4C. The number of turns of bias winding wound on each of the read out reactor cores 45A1–45F5 is the same and a source of negative DC potential 73 is connected to the bias winding 72 so that the read out reactor cores are normally biased beyond negative magnetic saturation. Control signal generators 75–80 are connected to the control windings 66–71 to apply control signals thereto which overcome the effect of the negative bias so that maximum flux change pulses are sequentially induced in succeeding ones of the read out reactor cores 45A1–45F5 (left to right as illustrated in FIGS. 4A, 4B, and 4C) during each half cycle of operation.

The control windings 66–71 have periodic characteristic variations in the winding patterns which are distinct from but bear a predetermined relationship with respect to each other so that a different combination of winding patterns is established on each of the thirty read out reactor cores 45A1–45F5, as will be described in detail hereinafter. The control signals applied to the control windings 66–71 have polarities, frequencies, and amplitudes which are determined by the winding patterns and the negative bias to accomplish sequential pulsing of the thirty read out reactor cores during each half cycle of operation. The control signal amplitudes are so selected that the maximum flux change pulses induced thereby in the read out reactor cores 45A1–45F5 have sufficient amplitudes to apply magnetizing forces to the associated memory devices 42A1–42F5 or 43A1–43F5 which sequentially drive the memory devices that have attained the secondary stable states to the primary stable states so that flux change pulses are sequentially induced therein.

Referring again to FIGS. 4B and 4C, each of the memory devices 42C1–42C5 and 43C1–43C5 also has an output winding 63C1–63C5 and 64C1–64C5 wound thereon so as to be electromagnetically associated therewith and each of the output windings has the same number of turns. The output windings 63C1–63C5 are connected to form a series arrangement and the output windings 64C1–64C5 are also connected to form a series arrangement. During the first half of each cycle of operation, the switching circuit 49 operates to connect the series arrangement of the output windings 64C1–64C5 in series with the output conductor 41 and, during the second half of each cycle of operation, the switching circuit 49 operates to connect the series arrangement of the output windings 63C1–63C5 in series with the output conductor 41.

Thus, as succeeding ones of the memory devices 43C1–43C5 which have attained the secondary stable states are driven to the primary stable states during the first half of each cycle of operation, a series of time related output data bits representative of previously stored data bits are sequentially induced in the output conductor 41 by the flux change pulses induced in the memory devices 43C1–43C5 since the series arrangement of the output windings 64C1–64C5 is connected in series with the output conductor 41. As succeeding ones of the memory devices 42C1–42C5 which have attained the secondary stable states are sequentially driven to the primary stable states during the second half of each cycle of operation, a series of time related output data bits representative of previously stored data bits are sequentially induced in the output conductor 41 by the flux change pulses induced in the memory devices 42C1–42C5 since the series arrangement of the output windings 63C1–63C5 is connected in series with the output conductor 41.

In the transmission system arrangement illustrated in FIG. 3 wherein data bits from the six transmission systems 40A–40F are to be sequentially transmitted over the single output conductor 41, all the previously stored data bits must be read out in series in the time period required to independently store input data bits in each of the transmission systems. To accomplish this, flux change pulses must be sequentially induced in the thirty read out reactor cores 45A1–45F5 of all the transmission systems 40A–40F in the time period required to sequentially induce flux change pulses in the six storing reactor cores of each transmission system. Therefore, the control signals applied to the control windings 66–71 must cause maximum flux change pulses to be sequentially induced in succeeding ones of the read out reactor cores 45A1–45F5 of the six transmission systems 40A–40F at six times the speed at which maximum flux change pulses are sequentially induced in succeeding ones of the start pulse reactor core and the storing reactor cores of each transmission system 40A–40F by the control signals applied to the control windings associated therewith, 52–54 in FIGS. 4A, 4B, and 4C.

*Switching circuit 49*

The above-mentioned switching circuit 49 (FIG. 4A) is provided to perform the necessary switching operations for the transmission system 40C. The switching circuit 49 consists of a pair of transistors T11 and T12, a switching signal generator 82 which controls the operation of the transistors, and a sync pulse gate 83 which controls the operation of the switching signal generator 82 in a predetermined timed relationship with respect to the outputs of the control signal generators 55–57 and the outputs of the control signal generators 75–80.

The transistors T11 and T12 are operated by the output of the switching signal generator 82 to perform the switching signal operation. The emitters of both the transistors are connected to ground. The collector of the transistor T11 is connected (1) to one side of the series arrangement of the output windings 64C1–64C5 on the memory devices 43C1–43C5 of set II, (2) to one side of all the output control windings 62C1–62C5 on the memory devices 43C1–43C5 of set II, and (3) to one side of all the input windings 46C1–46C5 on the memory devices 42C1–42C5 of set I. The collector of the transistor T12 is connected (1) to one side of the series arrangement of the output windings 63C1–63C5 on the memory devices 42C1–42C5 of set I, (2) to one side of all the output control windings 61C1–61C5 on the memory devices 42C1–42C5 of set I, and (3) to one side of all the input windings 47C1–47C5 on the memory devices 43C1–43C5 of set II.

The base of the transistor T11 is connected to a first output terminal 82A of the switching signal generator 82 so that, when the switching signal generator output is positive (during the first half of each cycle of operation), the transistor T11 conducts (1) to complete the series connection between the output windings 48C1–48C5 on the storing reactor cores 44C1–44C5 and the input windings 46C1–46C5 on the memory devices 42C1–42C5 of set I, (2) to complete the series connection between the output windings 65C1–65C5 on the read out reactor cores 45C1–45C5 and the output control windings 62C1–62C5 on the memory devices 43C1–43C5 of set II, and (3) to complete the series connection between the output conductor 41 and the output windings 64C1–64C5 on the memory devices 43C1–43C5 of set II. This connection thus permits sequential storage of data bits in the memory devices of set I and read out of data bits previously stored in the memory devices of set II.

The base of the transistor T12 is connected to a second output terminal 82B of the switching signal generator 82 to reverse the connections of sets I and II. Thus, when the switching generator output is negative (during the second half of each cycle of operation), the transistor T12 conducts (1) to complete the series connection beteween the output windings 48C1–48C5 on the storing reactor cores 44C7–44C5 and the input windings 47C1–47C5 on the memory devices 43C1–43C5 of set II, (2) to complete the series connection between the output windings 65C1–65C5 on the read out reactor cores 45C1–45C5 and the output control windings 61C1–61C5 on the memory devices 42C1–42C5 of set I, and (3) to complete the series connection between the output conductor 41 and the output windings 63C1–63C5 on the memory devices 42C1–42C5 of set I.

The synchronizing or "sync" pulse gate 83 is electromagnetically associated with the start pulse reactor core 44CS and the last read out reactor core 45B5 (top of FIG. 4A) of the next preceding transmission system 40B, so that the operation of the switching signal generator 82 is synchronized with the inducement of maximum flux change pulses in succeeding ones of the storing reactor cores 44C1–44C5. However, such synchronization may be blanked out by operation of the read out reactor core 45B5 to momentarily delay the switching of the generator 82 as described below. The sync pulse gate 83 controls switching of the polarity of the output of the switching signal generator 82 so that the memory devices 42C1–42C5 or 43C1–43C5 associated with the read out reactor cores 45C1–45C5 are not disassociated therewith until data bits representative of the data bits previously stored in the associated memory devices have been induced in the output conductor 41.

The sync pulse gate 83 includes a transistor T13 which has its emitter connected to ground. The collector of the transistor T13 is connected to the switching signal generator 82 by a sync output conductor 84 and is connected through a resistor R31 to a positive potential designated as A+. The base of the transistor T13 is connected (1) through a diode D31 and a capacitor C31 to the output winding 48CS on the start pulse reactor core 44CS, (2) through the diode D31 and a resistor R32 to the positive potential A+, (3) through a diode D32, a resistor R33, and a diode D33 to a sync control winding SC45B on the last read out reactor core 45B5 of the next preceding transmission system 40B, and (4) through the diode D32, the resistor R33, and a capacitor C32 to ground.

A "0" output signal (ground) is normally provided in the sync output conductor 84 since current flows through the resistor R32 and the diode D31 to cause the transistor T13 to turn on (conduct) and cause the collector of the transistor to be at ground potential. When a start signal is provided by the data source 60, a maximum flux change pulse is induced in the start pulse reactor core 44CS by the control signals applied to the control windings 52–54 which combines with a flux change pulse induced by application of the start signal to the input winding 50CS so that a sync pulse is induced in the output winding 48CS. The sync pulse prevents current from flowing through the diode D31 which causes the transistor T13 to turn off (nonconducting) so that the potential at the transistor collector rises above ground and a "1" output signal (positive) is provided in the sync output conductor 84 which causes the output signal provided by the switching signal generator 18 to switch from one polarity to the opposite polarity.

However, as a maximum flux change pulse is induced in the last read out reactor core 45B5 of the next preceding transmission system 40B during the sequential read out of previously stored data bits, a sync blank pulse is induced in the sync control winding SC45B on the read out reactor core 45B5. The sync blank pulse momentarily charges the capacitor C32, and the capacitor C32 then discharges through the resistor R33 and the diode D32 which causes the transistor T13 to turn on (conduct) so that a "0" output signal is provided in the sync output conductor 84. The transistor T13 is turned on by the discharging of the capacitor C32 for a time period determined by the time constant of the resistor R33 and the capacitor C32. The time period is preset to correspond to the time required to sequentially induce maximum flux change pulses in succeeding ones of the read out reactor cores 45C1–45C5. Thus, during the time period required for discharging the capacitor C32, a sync pulse induced in the output winding 48CS of the start pulse reactor core 44CS is rendered ineffective and does not turn off the transistor T13. The switching signal generator 82 is designed to switch the polarity of its output automatically at the end of the capacitor discharging period so that a subsequent sync pulse is not required.

Thus, it may be seen that the switching circuit 49 is designed to synchronize its operation with the inducement of maximum flux change pulses in the read out reactor cores 45C1–45C5 so that the polarity of the output of the switching signal generator 82 is not reversed until data bits previously stored in the memory devices 42C1–42C5 or 43C1–43C5 are read out.

*First storing control winding pattern*

In accordance with a first embodiment of the multiplex transmission system 40C illustrated in FIGS. 4A, 4B, and 4C, the control windings 52–54 have periodic characteristic variations so that a different combination of winding patterns of the control windings is established on each of the reactor cores 44CS and 44C1–44C5. The control windings 52–54 are illustrated in detached side-by-side relation in FIG. 5 so that the operation thereof may be depicted more clearly.

The first control winding 52 is wound on the reactor cores 44CS and 44C1–44C5 in a cosinusoidal pattern so that the number of turns $N_{cos}$ wound on each reactor core is determined by the following equation:

$$N_{cos} = N_{max} \cos 2\pi x/n = 4 \cos \theta$$

wherein $N_{max}$ is an arbitrary constant designating the maximum number of turns (chosen as 4 in the illustrated embodiment), $x$ is the number of the particular reactor core (the reactor cores 44CS and 44C1–44C5 being sequentially numbered from 0 to 5), $n$ is the total number of reactor cores (6 in the illustrated embodiment), and $\theta$ is substituted for $2\pi x/n$ and is the angular interval for the particular reactor core (substituting in the values of $x$ and $n$, $\theta$ varies in 60° intervals from 0° to 300°).

Figure 5:
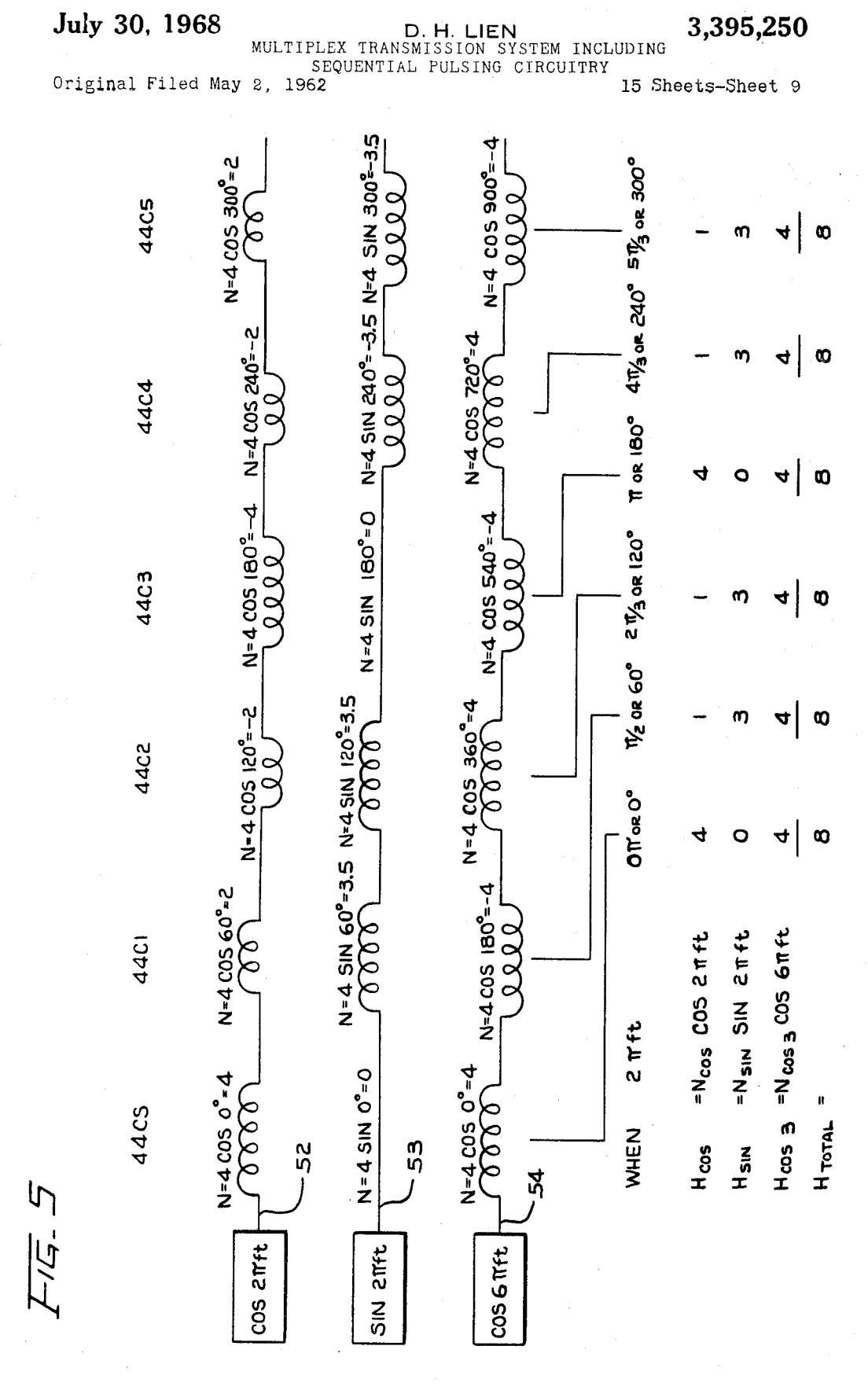

By solving the equation set forth above for the cosine control winding 52, the number of turns of the cosine control winding 52 associated with the start pulse reactor core 44CS is four turns in the first hand or positive direction since $N_{cos} = 4 \cos 0°$ and the cosine of 0° is 1. The number of turns of the cosine control winding 52 associated with the storing reactor core 44C1 is two turns in the first hand or positive direction since $N_{cos} = 4 \cos 60°$ and the cosine of 60° is 0.5. Similarly, the number of turns of the cosine control winding 52 associated with each succeeding storing reactor core 44C2–44C5 may be determined by solving the above-mentioned equation so that the number of turns set forth in FIG. 5 are provided.

The second control winding 53 is wound on the reactor cores 44CS and 44C1–44C5 in a sinusoidal pattern so that the number of turns $N_{sin}$ wound on each reactor core is determined by the following equation:

$$N_{sin} = N_{max} \sin 2\pi x/n = 4 \sin \theta$$

By solving this equation for the sine control winding 53, the number of turns of the sine control winding 53 associated with the start pulse reactor core 44CS is 0 turns since $N_{sin} = 4 \sin 0°$ and the sine of 0° is 0. The number of turns of the sine control winding 53 associated with the storing reactor core 44C1 is approximately three and one-half turns in the first hand or positive direction since $N_{sin} = 4 \sin 60°$ and the sine of 60° is 0.866. Similarly, the number of turns of the sine control winding 53 associated with each succeeding storing reactor core 44C2–44C5 may be determined by solving the above-mentioned equation so that the number of turns set forth in FIG. 5 are provided.

The third control winding 54 is wound on the reactor cores 44CS and 44C1–44C5 in a cosinusoidal pattern so that the number of turns $N_{cos\,3}$ wound on each reactor core is determined by the following equation:

$$N_{cos\,3} = N_{max} \cos 3(2\pi x/n) = 4 \cos 3\theta$$

By solving this equation for the cosine control winding 54, the number of turns of the cosine control winding 54 associated with the start pulse reactor core 44CS is four turns in the first hand or positive direction since $N_{\cos 3}=4 \cos 0°$ and the cosine of 0° is 1. The number of turns of the cosine control winding 54 associated with the storing reactor core 44C1 is four turns in the second hand or negative direction since $N_{\cos 3}=4 \cos 180°$ and the cosine of 180° is −1. Similarly, the number of turns of the cosine control winding 54 associated with each succeeding storing reactor core 44C2–44C5 may be determined by solving the above-mentioned equation so that the number of turns set forth in FIG. 5 are provided.

The control signal generators 55–57 apply control signals to the control windings 52–54 which also vary according to sinusoidal and cosinusoidal functions. The first control signal generator 55 applies a control signal to the cosine control winding 52 which varies according to the equation $$I_{\cos}=I_{\max} \cos 2\pi ft = \cos 2\pi ft$$

wherein $f$ is frequency, $t$ is time, and $I_{\max}$ is an arbitrary constant designated as the maximum value of the control signals generated by the control signal generators 55–57 (chosen as 1 in the illustrated embodiment); the second control signal generator 56 applies a control signal to the sine control winding 53 which varies according to the equation $$I_{\sin}=I_{\max} \sin 2\pi ft = \sin 2\pi ft$$

and the third control signal generator 57 applies a control signal to the cosine control winding 54 which varies according to the equation $$I_{\cos 3}=I_{\max} \cos 3\ (2\pi ft) = \cos 3\ (2\pi ft)$$

The magnetizing energy $H_{\cos}$ supplied to a reactor core by applying the cosine control signal to the cosine control winding 52 is determined by the equation $$H_{\cos}=I_{\cos}N_{\cos}=(I_{\max} \cos 2\pi ft)(N_{\max} \cos 2\pi x/n)$$
$$=(\cos 2\pi ft)(4 \cos 2\pi x/6)$$

the magnetizing energy $H_{\sin}$ supplied to a reactor core by applying the sine control signal to the sine control winding 53 is determined by the equation $$H_{\sin}=I_{\sin}N_{\sin}=(I_{\max} \sin 2\pi ft)(N_{\max} \sin 2\pi x/n)$$
$$=(\sin 2\pi ft)(4 \sin 2\pi x/6)$$

and the magnetizing energy supplied to a reactor core by applying the cosine control signal to the cosine control winding 54 is determined by the equation $$H_{\cos 3}=I_{\cos 3}N_{\cos 3}=[I_{\max} \cos 3\ (2\pi ft)]$$
$$[N_{\max} \cos 3\ (2\pi x/n)]$$
$$=[\cos 3\ (2\pi ft)][4 \cos 3\ (2\pi x/6)]$$

The total magnetizing energy supplied to a reactor core is provided by the summation of the magnetizing energies supplied to the reactor core by the three control signals and the maximum total magnetizing energy sequentially shifts from one of the reactor cores 44CS and 44C1–44C5 to the next at a constant rate in timed relationship with respect to the peaks of the cosine control signal applied to the cosine control winding 54.

The relationship of the maximum magnetizing energies with respect to the reactor cores 44CS and 44C1–44C5 is illustrated in FIG. 5 as the value of $2\pi ft$ is varied in $\pi/3$ or 60° intervals between $0\pi$ and $5\pi/3$. As previously set forth, the energy induced by supplying the control signals to the control windings 52–54 is equal to $[N_{\cos}][\cos 2\pi ft]$, $[N_{\sin}][\sin 2\pi ft]$, and $[N_{\cos 3} \cos 3\ (2\pi ft)]$. In the illustrated example, the maximum cumulative magnetizing energies are equal to eight and mathematical solutions for the sequential inducing thereof are set forth below.

When $2\pi ft=0\pi$ or 0°, the magnetizing energy induced adjacent the start pulse reactor cores 44CS has a maximum positive value since (1) $H_{\cos}=4 \cos 0°=4\times 1=4$, (2) $H_{\sin}=4 \sin 0°=0$, and (3) $H_{\cos 3}=4 \cos 0°=4\times 1$ =4, so that $H_{\text{total}}=8$. When $2\pi ft=\pi/3$ or 60°, the magnetizing energy induced adjacent the storing reactor core 44C1 has a maximum positive value since (1) $H_{\cos}=2 \cos 60°=2\times .5=1$, (2) $H_{\sin}=3.5 \sin 60°=3.5\times .866=3$, and (3) $H_{\cos 3}=(-4) \cos 180°=(-4)\times(-1)=4$, so that $H_{\text{total}}=8$. Similarly, as $2\pi ft$ increases in $\pi/3$ or 60° intervals, maximum positive magnetizing energies are sequentially induced adjacent succeeding ones of the storing reactor cores 44C2–44C5. Thus, during each half cycle of operation, maximum positive magnetizing energies are sequentially induced adjacent succeeding ones of the reactor cores 44CS and 44C1–44C5.

It should be noted that the third control winding 54 is provided so that the maximum magnetizing energies induced adjacent the storing reactor cores have peaks which are sharper, narrower, and higher. If more control windings were added, the peaks of the magnetizing energies would be sharper, narrower, and higher yet.

*Second storing control winding pattern*

Control windings having binary winding patterns and square wave generators (see FIG. 6) may be substituted for the sinusoidal control windings and the sinusoidal generators illustrated in FIGS. 4A, 4B, 4C, and 5 to provide for the sequential inducing of maximum flux change pulses in the succeeding ones of the reactor cores 44CS and 44C1–44C5.

Similarly to the sinusoidal control windings, the binary control windings B1–B3 are wound on the reactor cores 44CS and 44C1–44C5 and the binary control windings B1–B3 have periodic reversals in the direction of winding which divide the control windings into specific regions B1A–B1F, B2A–B2F, and B3A–B3F which are associated with the reactor cores 44CS and 44C1–44C5 so that a different combination of winding patterns of the control windings is established on each of the storing reactor cores. The binary control windings B1–B3 are illustrated in detached side-by-side relation in FIG. 6 so that the operation thereof may be depicted more clearly. With the binary winding pattern, the number of turns N wound on each of the reactor cores 44CS and 44C1–44C5 is the same (one turn in the illustrated embodiment) and only the winding directions vary.

The reversal intervals of the control windings B1–B3 are in a binary winding pattern such that a first control winding (the winding B1) is provided with a reversal interval that corresponds with the succeeding reactor cores 44CS and 44C1–44C5: that is, the region B1A is wound in a first hand helix which will be designated arbitrarily as the positive direction; the region B1B is wound in a second hand helix which will be designated arbitrarily as the negative direction; the region B1C is a first hand or positive helix; the region B1D is a second hand or negative helix; the region B1E is a first hand or positive helix; and the final region B1F is a second hand or negative helix. The second control winding B2 is provided with a reversal interval which is double that of the first control winding B1 and the third control winding B3 is provided with a reversal interval which is double that of the second control winding B2. Thus in the illustrated example, the regions B2A, B2B, B2E, B2F, and B3A–B3D are first hand or positive helices and the regions B2C, B2D, B3E and B3F are second hand or negative helices.

Three square wave generators SWG1–SWG3 are preferably provided for applying square wave signals, consisting of positive and negative pulses of equal amplitudes, to the control windings B1–B3 as illustrated in FIG. 6. The square wave inputs to the control windings are in a binary frequency pattern such that the square wave input applied to the first control winding B1 is of the highest frequency, the square wave input applied to the second control winding B2 is of a frequency which is one-half the frequency of the input applied to the first control winding B1, and the square wave input applied to the third control winding B3 is of a frequency which is one-half the frequency of the input applied to the second control winding B2.

As previously set forth, the reactor cores 44CS and 44C1–44C5 are negatively biased beyond magnetic saturation by applying a negative DC bias signal from a source 51 to the series arrangement of the bias windings 50CS and 50C1–50C5 which are wound about the reactor cores. With the binary control winding arrangement, any given reactor core 44CS and 44C1–44C5 can be driven out of saturation and have a magnetic flux change pulse induced therein only when the regions of all the control windings B1–B3 associated with this reactor core are simultaneously positive in sense. A region of each control winding is "positive in sense" either (1) when a positive signal is applied to the control winding and the region is a first hand or positive helix or (2) when a negative signal is applied to the control winding and the region is a second hand or negative helix.

Because of the binary winding pattern established between the control windings B1–B3, only those regions of the three control windings which are associated with a selected one of the reactor cores are simultaneously positive in a sense for any combination of positive and negative inputs to the control windings. Therefore, only one of the reactor cores is driven out of saturation and has a magnetic flux change pulse induced therein for each possible combination of the positive and negative inputs to the control winding.

From time $t_0$–$t_1$ depicted in FIG. 6, the square wave inputs to the control windings B1–B3 are all positive. The regions B1A–B3A of the control windings are simultaneously positive in sense during this time period since the regions are first hand helices and the control winding inputs are positive. Thus, the start pulse reactor core 44CS is driven out of saturation and has a flux change pulse induced therein since the effect of the negative DC bias is overcome by the cumulative positive effect of the inputs to the control windings.

The negative DC bias is not overcome in the storing reactor cores 44C1–44C5 from time $t_0$–$t_1$, since the associated control winding regions are not all positive in sense; that is, regions B1B, B2C, B1D, B2D, B3E, B1F, and B3F are second hand regions and, since the signals applied to the control windings B1–B3 are positive, the control windings are not all positive in sense at these regions, which is the necessary condition to overcome the bias effect of the negative DC bias.

From time $t_1$–$t_2$, the control winding sections B1B–B3B are simultaneously positive in sense, since the input to the control winding B1 is negative and the winding is second hand helix at the region B and since the inputs to the control windings B2 and B3 are positive and the windings are a first hand helix at the region B. Therefore, from time $t_1$–$t_2$, the negative bias is overcome only at the storing reactor core 44C1 and a flux change pulse is induced therein.

From time $t_2$–$t_3$, the control winding regions B1C–B3C are simultaneously positive in sense, since the inputs to the control windings B1 and B3 are positive and the windings are first hand helices at the region C and since the input to the control winding B2 is negative and the winding is a second hand helix at the region C. Therefore, from time $t_2$–$t_3$, the negative bias is overcome only in the storing reactor core 44C2 and a flux change pulse is induced therein.

From time $t_3$–$t_4$, the control winding regions B1D–B3D are simultaneously positive in sense, since the inputs to the control windings B1 and B2 are negative and the windings are second hand helices at region D and since the input to the control winding B3 is positive and the winding is a first hand helix at region D. Therefore, from time $t_3$–$t_4$, the negative bias is overcome in the storing reactor core 44C3 and a flux change pulse is induced therein.

From time $t_4$–$t_5$, the control winding regions B1E–B3E are simultaneously positive in sense, since the inputs to the control windings B1 and B2 are positive and the windings are first hand helices at region E and since the input to the control winding B3 is negative and the winding is a second hand helix at region E. Therefore, from time $t_4$–$t_5$, the negative bias is overcome in the storing reactor core 44C4 and a flux change pulse is induced therein.

From time $t_5$–$t_6$, the control winding sections B1F–B3F are simultaneously positive in a sense since the inputs to the control windings B1 and B3 are negative and the windings are second hand helices at region F and since the input to the control winding B2 is positive and the winding is a first hand helix at region F. Therefore, from time $t_5$–$t_6$, the negative bias is overcome in the storing reactor core 44C5 and a flux change pulse is induced therein.

From time $t_6$–$t_8$, the inputs to the control windings will have no effect on the reactor cores since only six reactor cores are utilized and the inputs would only be effective to overcome the negative bias on a seventh storing reactor core and an eighth storing reactor core, if eight storing reactor cores were utilized.

As has been set forth in the foregoing description, flux change pulses are sequentially induced in succeeding ones of the reactor cores 44CS and 44C1–44C5. When the binary arrangement illustrated in FIG. 6 is substituted in the multiplex transmission system 40C illustrated in FIGS. 4A, 4B, and 4C, a series of time related input data bits are generated in the data source 60 in a prescribed timed relationship with respect to the control signals generated by the control signal generators SWG1–SWG3 so that the negative bias on the reactor cores 44CS and 44C1–44C5 is reduced in a prescribed timed relationship with respect to the inducing of positive flux change pulses in succeeding ones of the reactor cores 44CS and 44C1–44C5 by the control signals. The amplitudes of the input data bits generated by the data source 60 are so selected that the negative bias on the storing reactor cores 44C1–44C5 is sufficiently reduced thereby to permit flux change pulses to be induced in selected ones of the storing reactor cores by the control signals which have sufficient amplitudes to cause selected ones of the associated memory devices 42C1–42C5 or 43C1–43C5 to be driven from the primary stable states to the secondary stable states to store data bits representative of the input data bits.

The operation of the transmission system 40C with the binary control windings is similar to the operation set forth with the three sinusoidal control windings. Thus, during the first half of each cycle of operation, selected ones of the memory devices 42C1–42C5 are sequentially driven from the primary stable states to the secondary stable states and, during the second half of each cycle of operation, selected ones of the memory devices 43C1–43C5 are sequentially driven from the primary stable states to the secondary stable states.

Third storing control winding pattern

A greater number of sinusoidal and cosinusoidal control windings and sinusoidal and cosinusoidal control signal generators (see FIGS. 7A and 7B) may be substituted for the sinusoidal and cosinusoidal control windings and sinusoidal and cosinusoidal control signal generators illustrated in FIGS. 4A, 4B, 4C, and 5 to provide for the sequential inducing of maximum flux change pulses in succeeding ones of the reactor cores 44CS and 44C1–44C5. With the windings and generators illustrated in FIGS. 7A and 7B, the negative bias is not required and maximum magnetizing energies are briefly induced at succeeding ones of the reactor cores such that the intensity of each maximum magnetizing energy rises from zero to some peak value and then returns to zero before the next succeeding reactor core is subjected to a similar brief magnetizing energy.

Figure 7A:
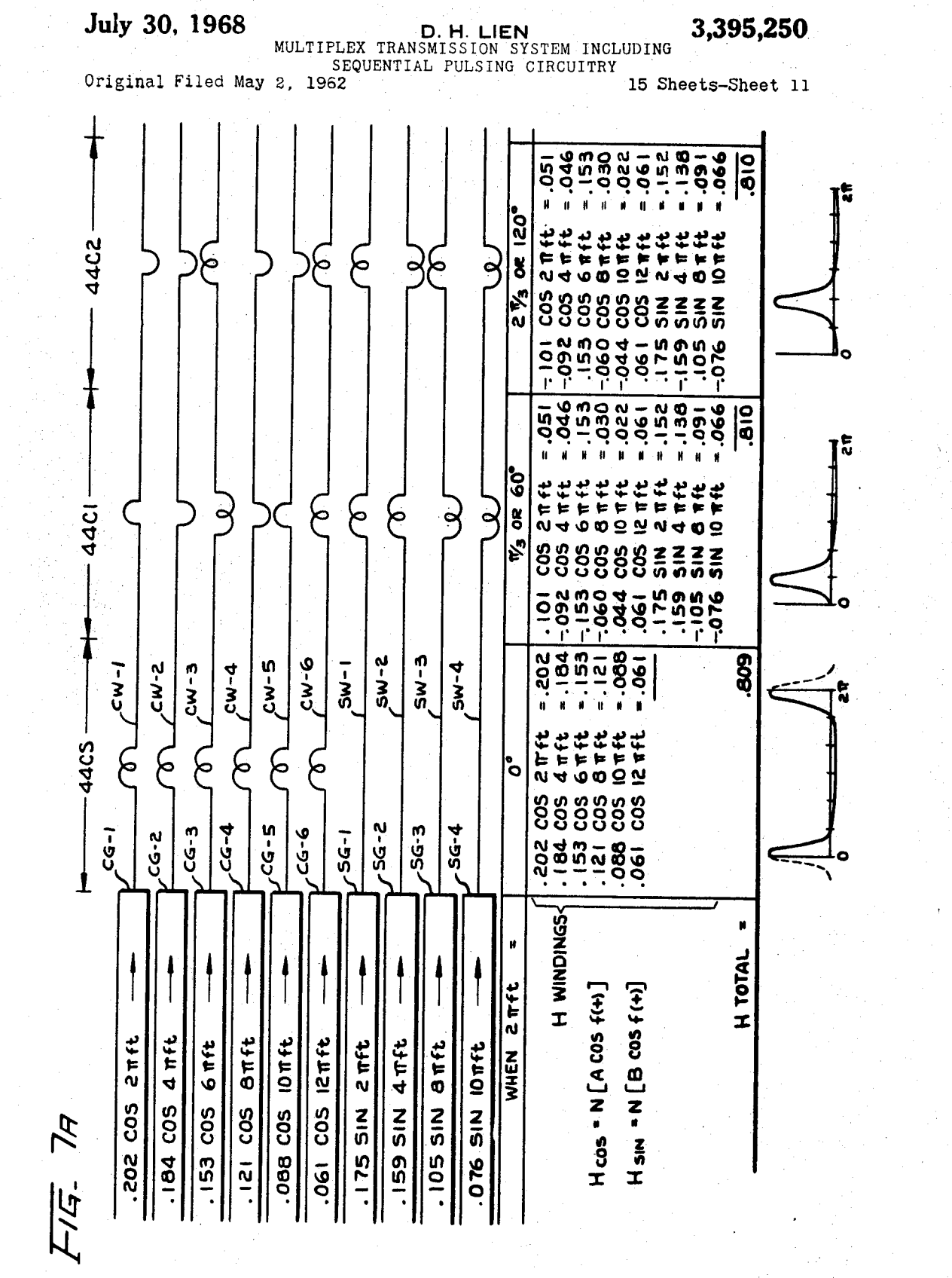

Similar to the sinusoidal and cosinusoidal varying control windings illustrated in FIGS. 4A, 4B, 4C, and 5, the sinusoidally and cosinusoidally varying control windings illustrated in FIGS. 7A and 7B have periodic characteristic variations so that a different combination of winding patterns of the control windings is established on each of the reactor cores 44CS and 44C1–44C5.

A first plurality of control windings CW1–CW6 are wound on the reactor cores 44CS and 44C1–44C5 in cosinusoidal winding patterns having prescribed harmonic relationships so that the number of turns $N_{cw}$ of the control windings wound on each of the reactor cores vary according to the following equations:

(1) $N_{cw1} = N_{max} \cos 2\pi x/n = \cos \theta$
(2) $N_{cw2} = N_{max} \cos 4\pi x/n = \cos 2\theta$
(3) $N_{cw3} = N_{max} \cos 6\pi x/n = \cos 3\theta$
(4) $N_{cw4} = N_{max} \cos 8\pi x/n = \cos 4\theta$
(5) $N_{cw5} = N_{max} \cos 10\pi x/n = \cos 5\theta$
(6) $N_{cw6} = N_{max} \cos 12\pi x/n = \cos 6\theta$ wherein $N_{max}$ is an arbitrary constant designated as the maximum number of turns (chosen as 1 in the illustrated embodiment), $x$ is the number of the particular reactor core (the reactor cores 44A–44F being sequentially numbered from 0 to 5), $n$ is the total number of reactor cores (6 is the illustrated embodiment) and $\theta$ equals $2\pi x/n$ and is the angular interval for the particular storing reactor core (substituting in values of $x$ and $n$, $\theta$ varies from 0° to 300° in 60° intervals). By solving the above cosine control winding equations, the number of turns set forth in FIGS. 7A and 7B are provided.

A second plurality of control windings SW1–SW4 are wound on the reactor cores 44CS and 44C1–44C5 in sinusoidal winding patterns having prescribed harmonic relationships so that the number of turns $N_{sw}$ of the sine control windings wound on each of reactor cores vary according to the following equations:

(1) $N_{sw1} = N_{max} \sin 2\pi x/n = 1.155 \sin \theta$
(2) $N_{sw2} = N_{max} \sin 4\pi x/n = 1.155 \sin 2\theta$
(3) $N_{sw3} = N_{max} \sin 8\pi x/n = 1.155 \sin 4\theta$
(4) $N_{sw4} = N_{max} \sin 10\pi x/n = 1.155 \sin 5\theta$ wherein the maximum possible number of turns $N_{max}$ for the sine control windings is chosen as 1.155 so that, when $\theta$, $2\theta$, $4\theta$, and $5\theta$ are equal to angles equivalent to 60°, the number of turns associated with the reactor cores is one turn. By solving the above sine control winding equations, the number of turns set forth in FIGS. 7A and 7B are provided.

The control signal generators CG1–CG6 and SG1–SG4 are provided to supply control signals to the control windings CW1–CW6 and SW1–SW4 and the control signals have the same harmonic frequency relationships as the control windings. The coefficients $a_j$ of the control signals which determine the maximum amplitudes of the control signals are determined by the Fourier cosine series expression $$a_j = \int_0^T p(t) \cos jt \, dt$$

wherein $j$ is the number of the particular control signal (the control signals being sequentially numbered in order of their harmonic relationships such that for the lowest harmonic signal $j=1$ and for each succeeding harmonic signal, $j$ increases in steps of 1) and $p(t)$ is a function describing the shape of the desired distribution curve $$\left[ p(t) = y = e^{-\frac{(x-\bar{x})^2}{20\sigma^2}} \right]$$

in the illustrated embodiment so that bell shaped flux change pulses which follow a Gaussian distribution curve (see FIG. 8) are sequentially induced in succeeding ones of the reactor cores 44CS and 44C1–44C5 as discussed hereinafter]. The sine control signal coefficients are determined from the Fourier cosine series expression by shifting the phase 90° with respect to time and with respect to their position along the sequence of reactor cores 44CS and 44C1–44C5.

The coefficients of the control signals are determined by using the Fourier cosine series expression when the distribution curve defined by the function $p(t)$ is to be symmetrical with respect to the vertical axis. If the distribution curve is to be symmetrical with respect to the origin, the coefficients of the control windings are determined by using a Fourier sine series expression and, for all other distribution curve relationships, the coefficients of the control windings are determined by using the general Fourier series expression.

The control signal generators are preconditioned to supply control signals having coefficients determined by the above Fourier cosine series expression so that the cosine control signal generators CG1–CG6 supply the following control signals to the respective control windings CW1–CW6:

(1) $I_{cg1} = a_j \cos 2\pi ft = .202 \cos 2\pi ft$
(2) $I_{cg2} = a_j \cos 4\pi ft = .184 \cos 4\pi ft$
(3) $I_{cg3} = a_j \cos 6\pi ft = .153 \cos 6\pi ft$
(4) $I_{cg4} = a_j \cos 8\pi ft = .121 \cos 8\pi ft$
(5) $I_{cg5} = a_j \cos 10\pi ft = .088 \cos 10\pi ft$
(6) $I_{cg6} = a_j \cos 12\pi ft = .061 \cos 12\pi ft$ and the sine control signal generators SG1–SG4 supply the following signal signals to the respective control windings SW1–SW4:

(1) $I_{sg1} = a_j \sin 2\pi ft = .175 \sin 2\pi ft$
(2) $I_{sg2} = a_j \sin 4\pi ft = .159 \sin 4\pi ft$
(3) $I_{sg3} = a_j \sin 8\pi ft = .105 \sin 8\pi ft$
(4) $I_{sg4} = a_j \sin 10\pi ft = .076 \sin 10\pi ft$ The magnetizing energy supplied to a reactor core by applying a cosine control signal to the associated one of the cosine control windings CW1–CW6 is determined by the equation $$H_{cos} = [N_{cos}] [a_j \cos f(t)]$$

and the magnetizing energy supplied to a reactor core by applying a sine control signal to the associated one of the sine control windings SW1–SW4 is determined by the equation $$H_{sin} = [N_{sin}] [a_j \sin f(t)]$$

wherein $f(t)$ is the particular harmonic function. The total magnetizing energy supplied to a reaction core is provided by the summation of the magnetizing energies supplied to the reactor core by all of the control signals and maximum cumulative magnetizing energies are sequentially induced adjacent succeeding ones of the reactor cores 44CS and 44C1–44C5 so that maximum flux change pulses are induced therein.

The relationship of the maximum cumulative magnetizing energies with respect to the reactor cores 44CS and 44C1–44C5 is illustrated in the table in FIGS. 7A and 7B as the value of $2\pi ft$ is varied in $\pi/3$ or 60° intervals between $0\pi$ and $2\pi$. When $2\pi ft = 0°$, the cumulative magnetizing energy induced at the start pulse reactor core 44CS is equal to a .809 which for the illustrated example is the maximum cumulative magnetizing energy. When $2\pi ft = 60°$, the cumulative magnetizing energy induced adjacent the storing reactor core 44C1 is equal to .810 which again is the maximum cumulative magnetizing energy. Similarly, the maximum cumulative magnetizing energy is induced at a constant rate adjacent succeeding ones of the remaining storing reactor cores 44C2–44C5 as $2\pi ft$ increases in 60° intervals.

As previously mentioned with respect to the function $p(t)$, the flux change pulse generated in a reactor core by the maximum cumulative magnetizing energy induced by the control signals has a Gaussian distribution curve of the type $$y = e^{-\frac{(x-\bar{x})^2}{2\sigma^2}}$$

as illustrated in FIG. 8 wherein $x$ is the displacement from the beginning of the curve, $\bar{x}$ is the mean of the distribution, and $\sigma$ is the standard deviation or spread of the curve (root mean square deviation from average). Ninety-six percent of the flux change pulse energy is dissipated between $(\bar{x}-2\sigma)$ and $(\bar{x}+2\sigma)$ as illustrated in FIG. 8 and the pulse generated in the illustrated embodiment dissipates 96% of the energy in the selected one of the reactor cores 44CS and 44C1–44C5. With this winding arrangement, Gaussian flux change pulses are sequentially induced by the control signals in succeeding ones of the reactor cores 44CS and 44C1–44C5 during each half cycle of operation and a peak flux change pulse is induced in only one of the reactor cores at any given time as illustrated by the pulses in FIGS. 7A and 7B.

When the sinusoidal arrangement illustrated in FIGS. 7A and 7B is substituted in the multiplex transmission system 40C illustrated in FIGS. 4A, 4B, and 4C, a series of time related input data bits are generated in the data source 60 in a prescribed timed relationship with respect to the control signals generated by the control signal generators CG1–CG6 and SG1–SQ4. The amplitudes of the input data bits generated by the data source 60 are so selected that the flux change pulse induced thereby in the storing reactor cores 44C1–44C5 combine with the flux change pulses induced in the storing reactor cores by the control signals to cause selected ones of the associated memory devices 42C1–42C5 or 43C1–43C5 to be driven from the primary stable states to the secondary stable states to store data bits representative of the input data bits.

The operation of the transmission system 40C with the sinusoidal control windings set forth above is similar to the operation set forth with the three sinusoidal control windings of the first control winding embodiment. Thus, during the first half of each cycle of operation, selected ones of the memory devices 42C1–42C5 are sequentially driven from the primary stable states to the secondary stable states and, during the second half of each cycle of operation, selected ones of the memory devices 43C1–43C5 are sequentially driven from the primary stable states to the secondary stable states.

*Read out control winding pattern*

As previously set forth, the control windings 66–71 (FIGS. 4A, 4B, and 4C) wound on the read out reactor cores 45A1–45F5 have periodic characteristic variations so that a different combination of winding patterns of the control windings is established on each of the read out reactor cores.

A first plurality of control windings 66–68 are wound on the read out reactor cores 45A1–45F5 in cosinusoidal winding patterns so that the number of turns $N_{cos}$ of each control winding wound on each read out reactor core is determined by the following equations:

(1) $N_{cos}\ 66 = N_{max} \cos 18\pi x/n = N_{max} \cos 9\theta$
(2) $N_{cos}\ 67 = N_{max} \cos 6\pi x/n = N_{max} \cos 3\theta$
(3) $N_{cos}\ 68 = N_{max} \cos 2\pi x/n = N_{max} \cos \theta$ wherein $N_{max}$ is an arbitrary constant designated as the maximum number of turns, $x$ is the number of the particular read out reactor core (the read out reactor cores 45A1–45F5 being sequentially numbered from 0 to 29), $n$ is the total number of read out reactor cores (30 is the illustrated embodiment), and $\theta$ equals $2\pi x/n$ and is the angular interval for the particular read out reactor core (substituting in values of X and $n$, $\theta$ varies from 0° to 348° in 12° intervals. By substituting in 32 for $N_{max}$ and solving the above cosine control winding equations, the number of turns set forth in the table of FIG. 9 are wound on the read out reactor cores 45A1–45F5.

A second plurality of control windings 69–71 are wound on the read out reactor cores 45A1–45F5 in sinusoidal winding patterns so that the number of turns $N_{sin}$ of each control winding wound on each read out reactor core is determined by the following equations:

(1) $N_{sin}\ 69 = N_{max} \sin 2\pi x/n = N_{max} \sin \theta$
(2) $N_{sin}\ 70 = N_{max} \sin 6\pi x/n = N_{max} \sin 3\theta$
(3) $N_{sin}\ 71 = N_{max} \sin 18\pi x/n = N_{max} \sin 9\theta$ By substituting 32 for $N_{max}$ and solving the above sine control winding equations, the number of turns set forth in the table of FIG. 9 are wound on the read out reactor cores 45A1–45F5.

The control signal generators 75–80 apply control signals to the control windings 66–71 which also vary according to sinusoidal and cosinusoidal functions. A first plurality of control signal generators 75–77 apply the following control signals to the respective cosine control windings 66–68:

(1) $I_{cos}\ 75 = I_{max} \cos 18\pi ft = I_{max} \cos 9wt$
(2) $I_{cos}\ 76 = I_{max} \cos 6\pi ft = I_{max} \cos 3wt$
(3) $I_{cos}\ 77 = I_{max} \cos 2\pi ft = I_{max} \cos wt$ and a second plurality of control signal generators 78–80 apply the following control signals to the respective sine control windings 69–71:

(1) $I_{sin}\ 78 = I_{max} \sin 2\pi ft = I_{max} \sin wt$
(2) $I_{sin}\ 79 = I_{max} \sin 6\pi ft = I_{max} \sin 3wt$
(3) $I_{sin}\ 80 = I_{max} \sin 18\pi ft = I_{max} \sin 9wt$ wherein $w$ equals $2\pi f$, $f$ is the frequency, $t$ is the time, and $I_{max}$ is an arbitrary constant designated as the maximum value of the control signals generated by the control signal generators 75–80.

The cumulative magnetizing force $H_{total}$ applied to each of the read out reactor cores 45A1–45F5 is determined by the following equation:

$$H_{total} = N_{bias}I_{bias} + (N_{max} \cos 2\pi x/n)(I_{max} \cos 2\pi ft)$$
$$+ (N_{max} \sin 2\pi x/n)(I_{max} \sin 2\pi ft) + (N_{max} \cos 6\pi x/n)$$
$$(I_{max} \cos 6\pi ft) + (N_{max} \sin 6\pi x/n)(I_{max} \sin 6\pi ft)$$
$$+ (N_{max} \cos 18\pi x/n)(I_{max} \cos 18\pi ft) + (N_{max} \sin 18\pi x/n)$$
$$(I_{max} \sin 18\pi ft)$$

wherein $N_{bias}$ is the number of turns of the bias winding and $I_{bias}$ is the DC bias signal applied to the bias winding. By solving the above equation, a magnetizing force $H_{max}$ is found to be sequentially induced adjacent succeeding ones of the read out reactor cores 45A1–45F5 in 12° intervals. Thus, the maximum magnetizing forces are sequentially induced adjacent all the read out reactor cores 45A1–45F5 during each half cycle of operation (360°). Since maximum magnetizing forces are sequentially induced adjacent succeeding ones of the storing reactor cores during each half cycle of operation, data bits previously stored in all the transmission systems 40A–40F are read out in the same time period required to store new data bits in each of the transmission systems.

Control windings wound according to binary winding patterns may be substituted for the read out control windings 66–71 illustrated in FIGS. 4A, 4B, and 4C and binary related square wave generators may be substituted for the control signal generators 75–80 to cause maximum magnetizing forces to be sequentially induced adjacent succeeding ones of the read out reactor cores 45A1–45F5 during each half cycle of operation. Since 30 read out reactor cores must have maximum magnetizing forces sequentially induced adjacent them during each half cycle of operation, five binary windings must be wound on each of the read out reactor cores.

A first binary control winding will have a reversal interval which corresponds with each succeeding read out reactor core 45A1–45F5; that is, the direction of the winding will be reversed on each succeeding read out reactor core. Each additional binary control winding will have a reversal interval which is double that of the next preceding binary control winding. The square wave generator associated with the first binary control winding will provide a square wave signal of a highest frequency and the square wave generator associated with each additional binary control winding will provide a square wave signal which has a frequency that is one-half of the frequency of the signal provided by the square wave generator associated with the next preceding binary control winding.

Thus, it may be seen that a transmitting circuit 40 consisting of the plurality of multiplex transmission systems 40A–40F illustrated in FIG. 3 has been provided wherein data bits previously stored in all the transmission systems 40A–40F are sequentially read out in series while new input data bits are independently stored in each of the transmission systems.

RECEIVER CIRCUIT FOR THE SECOND MULTIPLEX TRANSMISSION SYSTEM EMBODIMENT

As previously set forth with reference to FIG. 3, the series of time related output data bits induced in the output conductor 41 by operation of the transmitting transmission systems 40A–40F are received by the six receiving transmission systems 90A–90F wherein the output data bits from each of the transmission systems 40A–40F are independently transmitted to a data receiver within a different one of the six receiving transmission systems 90A–90F. One of the receiving transmission systems 90A–90F is illustrated in simplified schematic form in FIGS. 10A and 10B.

The receving system 90C illustrated in FIGS. 10A and 10B includes a plurality of ring-type magnetic memory devices 91C1–91C5 which are identical to the memory devices 42C1–42C5 and 43C1–43C5 of the previously described transmitting transmission system 40C illustrated in FIGS. 3 and 4. Thus, the memory devices 91C1–91C5 are bistable so that each memory device has a primary stable state (negative satuation) and a secondary stable state (positive saturation). A plurality of input reactor cores 92C1–92C5, wherein flux change pulses representative of data bits transmitted over the output conductor 41 may be induced, are electromagnetically associated with the memory devices 91C1–91C5 so that data bits representative of the data bits transmitted over the output conductor 41 may be stored in the memory devices 91C1–91C5.

Additionally, selected ones of the input reactor cores 92A1–92F5 of all the receiving systems 90A–90F and an output winding 93 are electromagnetically associated with the memory devices 91C1–91C5, so that the data bits stored therein are sequentially read out to induce a series of time related data bits representative of the stored data bits in the output conductor 93 while data bits are being stored in the memory devices of the other receiving systems 90A, 90B, and 90D–90F. Thus, the data bits are read out at a slower rate than they are stored since five data bits previously stored in one receiving system are read out while 25 data bits are being stored in the other receiving systems.

Each of the memory devices 91C1–91C5 has an electrically independent storing input winding 94C1–94C5 wound thereon so as to be electromagnetically associated therewith and each of the storing input windings 94C1–94C5 has the same number of turns. Each of the input reactor cores 92C1–92C5 has an electrically independent storing output winding 95C1–95C5 wound thereon so as to be electromagnetically associated therewith, and each of the storing output windings 95C1–95C5 has the same number of turns. Each of the storing input windings 94C1–94C5 is connected in series with one of the storing output windings 95C1–95C5 through a diode D41C1–D41C5 so that each of the memory devices 91C1–91C5 are electromagnetically associated with one of the input reactor cores 92C1–92C5.

When a flux change pulse representative of a data bit transmitted over the output conductor 41 is induced in one of the input reactor cores 92C1–92C5, a current pulse is induced in the associated series connection of one of the storing output windings 95C1–95C5 and one of the storing input windings 94C1–94C5 which applies a magnetizing force to the associated one of the memory devices 91C1–91C5 that urges the memory devices toward the secondary stable state. If the flux change pulse induced in the input reactor core has a sufficient amplitude, the memory device will be driven from the primary stable state to the secondary stable state. Thus, as flux change pulses of sufficient amplitudes are induced in selected ones of the input reactor cores 92C1–92C5, selected ones of the memory devices 91C1–91C5 are driven from the primary stable states to the secondary stable states to store data bits representative of the data bits transmitted over the output conductor 41.

The diodes D41C1–D41C5 are provided so that the negative portions (tails) of the flux change pulses induced in the input reactor cores 92C1–92C5 have no effect on the memory devices 91C1–91C5 as previously set forth with respect to the diodes D11–D30 of the transmission system 40C illustrated in FIGS. 4A–C.

Each of the input reactor cores 92A1–92F5 of all of the receiving systems 90A–90F has a bias winding 97A1–97F5 wound thereon so as to be electromagnetically associated therewith and each of the bias windings has the same number of turns. The bias windings 97A1–97F5 are connected to form a series arrangement which is connected to a source of negative DC potential 98 so that all the input reactor cores 92A1–92F5 are normally biased beyond negative magnetic saturation.

A plurality of electrically independent control windings 100–105 are wound about all the input reactor cores 92A1–92F5 so as to be electromagnetically associated therewith. Control signal generators 106–111 are connected to the control windings 100–105 to apply control signals thereto which overcome the effect of the negative bias so that maximum flux change pulses are sequentially induced in succeeding ones of the thirty input reactor cores 92A1–92F5 (left to right as illustrated in FIGS. 10A and 10B) during each half cycle of operation. The control windings 100–105 have winding patterns which are identical to the winding patterns of the control windings 66–71 illustrated in FIGS. 4A–C, and the control signal generators 106–111 supply control signals which are identical to the control signals supplied by the control signal generators 75–80 also illustrtaed in FIGS. 4A–C. The control signal amplitudes are so selected that the maximum flux change pulses induced thereby in the input reactor cores 92A1–92F5 do not have sufficient amplitudes to cause magnetizing forces to be applied to the memory devices 91A1–91F5 which have sufficient amplitude to drive the memory devices from the primary stable states to the secondary stable states.

The output conductor 41 is connected to one end of the series arrangement of the bias windings 97A1–97F5 so that, as a series of time related data bits are transmitted over the output conductor 41 from the transmission systems 40A–40F, the negative bias on the input reactor cores 92A1–92F5 is reduced in a prescribed timed relationship with respect to the inducement of maximum flux change pulses in succeeding ones of the input reactor cores by the control signals. The amplitudes of the series of time related data bits transmitted over the output conductor 41 are such that the negative bias on the input reactor cores 92A1–92F5 is sufficiently reduced thereby to permit flux change pulses to be induced in selected ones of the input reactor cores which have sufficient amplitudes to cause the associated ones of the memory devices 91A1–91F5 to be driven from the primary stable states to the secondary stable states to store data bits representative of the data bits transmitted over the output conductor 41. Thus, during each half cycle of operation, selected ones of the memory devices 91A1–91F5 are sequentially driven from primary stable states to secondary stable states.

Each of the memory devices 91A1–91F5 of all the receiving systems 90A–91F also has an electrically independent read out input winding 115A1–115F5 wound thereon so as to be electromagnetically associated therewith and each of the read out input windings has the same number of turns. Each of the input reactor cores 92A1–92F5 of all the receiving systems 90A–90F also has an electrically independent read out output winding 116A1–116F5 wound thereon so as to be electromagnetically associated therewith and each of the read out output windings has the same number of turns. Each of the read out input windings 115A1–115F5 is connected in series with one of the read out output windings 116A1–116F5 through a diode D42A1–D42F5 so that each of the memory devices 91A1–91F5 is electromagnetically associated with one of the input reactor cores 92A1–92F5 according to the schedule set forth in the table of FIG. 11.

When a flux change pulse is induced in one of the input reactor cores 92A1–92F5, a current pulse is induced in the associated series connection of one of the read out input windings 115A1–115F5 and one of the read out output windings 116A1–116F5 which applies a magnetizing force to the associated one of the memory devices 91A1–91F5 (see FIG. 11) that urges the memory device toward the primary stable state if the memory device has attained the secondary stable state. Thus, as flux change pulses of sufficient amplitude are induced in the input reactor cores 92A1–92F5, the associated memory devices 91A1–91F5 that have attained the secondary stable states are driven to the primary stable states.

The diodes D42A1–D42F5 are provided so that the negative portions (tails) of the flux change pulses induced in the input reactor cores 92A1–92F5 have no effect on the memory devices 91A1–91F5 as previously set forth with respect to the diodes D11–D30 of the transmission system 40C illustrated in FIGS. 4A–4D.

The number of turns of the read out input windings 115A1–115F5 and the number of turns of the read out output windings 116A1–116F5 are so selected that the maximum flux change pulses sequentially induced in the input reactor cores 92A1–92F5 by application of the control signals to the control windings 100–105 have sufficient amplitudes to cause magnetizing forces to be applied to the memory devices 91A1–91F5 which have sufficient amplitudes to drive the memory devices from the secondary stable states to the primary stable states. Thus, during each half cycle of operation, the memory devices of each receiving system that have been driven from the primary stable states to the secondary stable states to store data bits representative of data bits transmitted over the output conductor 41 are sequentially driven from the secondary stable states to the primary stable states while selected memory devices of the other receiving systems are being driven from the primary stable states to the secondary stable states to store data bits representative of data bits transmitted over the output conductor 41.

For example, the memory devices 91C1–91C5 (illustrated in FIG. 10) that have been previously driven from the primary stable states to the secondary stable states are sequentially driven from the secondary stable states to the primary stable states while selected ones of the memory devices 91A1–91B5 and 91D1–91F5 are driven from the primary stable states to the secondary stable states. Referring to FIG. 11, when a maximum flux change pulse is induced in the input reactor core 92D5 by application of the control signal to the control windings 100–105, the memory device 91C1 is driven from the secondary stable state to the primary stable state if it has attained the secondary stable state and the memory device 91D5 is urged toward the secondary stable state; when a maximum flux change pulse is induced in the input reactor core 92E4 by application of the control signals to the control windings 100–105, the memory device 91C2 is driven from the secondary stable state to the primary stable state if it has attained the secondary stable state and the memory device 91E4 is urged toward the secondary stable state; when a maximum flux change pulse is induced in the input reactor core 92F3, the memory device 91C3 is driven from the secondary stable state to the primary stable state if it has attained the secondary stable state and the memory device 91F3 is urged toward the secondary stable state; when a maximum flux change pulse is induced in the input reactor core 92A3, the memory device 91C4 is driven from the secondary stable state to the primary stable state if it has attained the secondary stable state and the memory device 91A2 is urged toward the secondary stable state; and when a maximum flux change pulse is induced in the input reactor core 92B1, the memory device 91C5 is driven from the secondary stable state to the primary stable state if it has attained the secondary stable state and the memory device 91B1 is urged toward the secondary stable state. Accordingly, the relationship of driving memory devices from the secondary stable states to the primary stable states and urging memory devices toward the secondary stable states may be determined by reference to the table of FIG. 11.

When one of the memory devices 91C1–91C5 (FIGS. 10A–B) is driven from the secondary stable state to the primary stable state, an output data bit representative of a data bit previously stored therein is induced in the output winding 93. The output winding 93 is connected to a data receiver 120 so that output data bits induced in the winding 93 are transmitted thereto. A diode D45 is connected in series with the output winding 93 so that output data bits are induced therein only when the memory devices 91C1–91C5 are driven from the secondary stable states to the primary stable states and not when the memory devices 91C1–91C5 are driven from the primary stable states to the secondary stable states.

Thus, it may be seen that a receiving circuit 90 consisting of a plurality of multiplex receiving systems 90A–90F illustrated in FIG. 3 has been provided wherein previously stored data bits are sequentially read out from one receiving system and transmitted to a data receiver while data bits representative of data bits transmitted over the output conductor 41 are sequentially stored in the other receiving systems.

While certain specific embodiments of the invention have been described in detail, it will be obvious that various modifications may be made from the specific details described without departing from the spirit and scope of the invention.

What is claimed is:

1. A multiplex transmission system for transmitting binary digit data signals in a single output conductor, which comprises:
   a plurality of data sources;
   two sets of bistable memory devices, each set including a plurality of memory devices equal in number to the number of data sources;
   storing control means responsive to input data bits produced by the data sources for causing selected memory devices within a selected set of memory devices to be driven from primary stable states to secondary stable states to store data bits representative of the input data bits therein;
   read out control means operating concomitantly with the storing control means for causing succeeding ones of the memory devices within a selected set of memory devices that have attained the secondary stable states to be sequentially driven to the primary stable states so that a series of time related data bits representative of previously stored data bits are induced in the ouput conductor; and
   switching means for alternately associating the storing control means with the two sets of memory devices and for alternately associating the read out control means and the output conductor with the set of memory devices not associated with the storing control means so that data bits representative of input data bits produced by the data sources are stored while data bits representative of previously stored data bits are sequentially read out.

2. The multiplex transmission system as recited in claim 1, wherein:
the bistable memory devices are magnetic memory devices;
the storing control means applies magnetizing forces to the selected memory memory devices of the selected set of memory devices which drive the selected memory devices from the primary stable states to the secondary stable states;
the read out control means sequentially applies magnetizing forces to succeeding ones of the memory devices of the selected set of memory devices that have attained the secondary stable states which sequentially drive the memory devices to the primary stable states; and
the switching means electromagnetically associates the storing control means, the read out control means, and the output conductor with the two sets of memory devices.

3. A multiplex transmission system for transmitting binary digit data signals in a single output conductor, which comprises:
a plurality of data sources;
two sets of bistable magnetic memory devices, each set including a plurality of memory devices equal in number to the number of data sources;
switching means for alternately associating the data sources electromagnetically with the two sets of memory devices and for alternately associating the output conductor electromagnetically with the set of memory devices not associated with the data sources so that data bits representative of input data bits produced by the data sources are stored while data bits representative of previously stored data bits are sequentially read out, each data source being independently associated electromagnetically with one of the memory devices in the set with which the data sources are associated so that, when an input data bit is produced by the data source a magnetizing force is applied to the associated memory device which urges the memory device toward the secondary stable state, the output conductor being electromagnetically associated with all the memory devices in the set with which it is associated so that a series of time related output data bits may be induced therein;
storing control means operating in timed relationship with respect to the switching means for applying magnetizing forces to the memory devices associated with the data sources which urge the memory devices toward the secondary stable states and which combine with the magnetizing forces applied to selected memory devices by input data bits to drive the selected memory devices from the primary stable states to the secondary stable states to store data bits representative of the input data bits therein; and
read out control means operating concomitantly with the storing control means for sequentially applying magnetizing forces to succeeding ones of the memory devices associated with the output conductor that have attained the secondary stable states which sequentially drive the memory devices to the primary stable states so that a series of time related output data bits representative of previously stored data bits are induced in the output conductor.

4. A multiplex transmission system for transmitting binary digit data signals in a single output conductor, which comprises:
a plurality of data sources;
two sets of bistable magnetic memory devices, each set including a plurality of memory devices equal in number to the number of data sources;
switching means for alternately associating the data sources electromagnetically with the two sets of memory devices and for alternately associating the output conductor electromagnetically with the set of memory devices not associated with the data sources so that data bits representative of input data bits produced by the data sources are stored while data bits representative of previously stored data bits are sequentially read out, each data source being independently associated electromagnetically with one of the memory devices in the set with which the data sources are associated so that, when an input data bit is produced by the data source a magnetizing force is applied to the associated memory device which urges the memory device toward the secondary stable state, the output conductor being electromagnetically associated with all the memory devices in the set with which it is associated so that a series of time related output data bits may be induced therein;
storing control means operating in timed relationship with respect to the switching means for applying magnetizing forces to the memory devices associated with the data sources which urge the memory devices toward the secondary stable states and which combine with the mangetizing forces applied to selected memory devices by input data bits to drive the selected memory devices from the primary stable states to the secondary stable states to store data bits representative of the input data bits therein;
a plurality of electrically independent control windings wound about the memory devices so as to be electromagnetically associated therewith, each control winding having periodic characteristic variations in the winding pattern which are distinct from but bear a predetermined relationship to the periodic characteristic variations of every other control winding so that a different combination of winding patterns of the control windings is established on each memory device;
means operating in timed relationship with respect to the switching means for alternately biasing the two sets of memory devices so that magnetizing forces are applied to the memory devices associated with the output conductor which urge the memory devices that have attained the secondary stable states toward the primary stable states; and
means operating in timed relationship with respect to the switching means for applying alternating control signals to the control windings that have polarities, frequencies, and amplitudes which are determined by the control winding patterns so that magnetizing forces are sequentially applied to succeeding ones of the memory devices associated with the output conductor which urge the memory devices that have attained the secondary stable states toward the primary stable states and which combine with the magnetizing forces applied thereto by the biasing means to sequentially drive the memory devices that have attained the secondary stable states to the primary stable states, a series of time related output data bits representative of previously stored data bits being induced in the output conductor when the memory devices are sequentially driven from the secondary stable states to the primary stable states.

5. The multiplex transmission system as recited in claim 4 wherein the storing control means includes:
an electrically independent input winding wound on each memory device so as to be electromagnetically associated therewith, all the input windings having the same number of turns, the switching means alternately connecting the data sources to the input windings of the two sets of memory devices to independently associated each data source electromagnetically with one of the input windings so that, when a data bit is produced by a data source, a magnetizing force is applied to the associated memory device which urges the memory device toward the secondary stable state; and the previously recited plurality of control windings, the alternating control signals applied to the control windings also sequentially applying magnetizing forces to succeeding ones of the memory devices associated with the data sources which urge the memory devices toward the secondary stable states and which combine with magnetizing forces applied to selected ones of the memory devices by input bits to sequentially drive the selected memory devices from the primary stable states to the secondary stable states to store data bits representative of the input data bits therein.

6. The multiplex transmission system as recited in claim 4 wherein:

the plurality of control windings includes a pair of control windings, the number of turns and the winding directions of a first control winding associated with each suceeding memory device being determined by the equation $$N_{sin} = N_{max} \sin 2\pi x/n$$

wherein $N_{max}$ is an arbitrary constant designated as the maximum number of turns, $x$ is the number of the particular memory device (the memory devices being sequentially numbered so that $x = 0, 1, 2 \ldots x$), and $n$ is the total number of memory devices, the number of turns and the winding directions of the second control winding associated with each succeeding memory device being determined by the equation $$N_{cos} = N_{max} \cos 2\pi x/n$$

the control signal supplied to the first control winding is defined by the equation $$I_{sin} = I_{max} \sin 2\pi ft$$

wherein $I_{max}$ is an arbitrary constant designated as the maximum value of the control signal and $t$ is time, and the control signal supplied to the second control winding is defined by the equation $$I_{cos} = I_{max} \cos 2\pi ft$$

so that (1), during each positive half cycle of the sine control signal, positive maximum cumulative magnetizing forces are sequentially applied thereby to succeeding memory devices of the first set of memory devices while negative maximum cumulative magnetizing forces are sequentially applied thereby to succeeding memory devices of the second set of memory devices and (2), during each negative half cycle of the sine control signal, positive maximum cumulative magnetizing forces are sequentially applied thereby to succeeding memory devices of the second set while negative maximum cumulative magnetizing forces are sequentially applied thereby to succeeding memory devices of the first set;

the input data bits produced by the data sources apply positive magnetizing forces to the associated memory devices;

the biasing means applies negative magnetizing forces to the associated memory devices;

the primary stable state of each memory device is a state of negative saturation and the secondary stable state of each memory device is a state of positive saturation so that a positive magnetizing force having a prescribed amplitude is required to drive a memory device from a primary stable state to a secondary stable state and a negative magnetizing force having a prescribed amplitude is required to drive a memory device from the secondary stable state to the primary stable state; and the switching means operates in timed relationship with respect to the control signals so that (1), during each positive half cycle of the sine control signal, the data sources are associated with the first set of memory devices and the biasing means and the output conductor are associated with the second set of memory devices and (2), during each negative half cycle of the sine control signal, the data sources are associated with the second set of memory devices and the biasing means and the output conductor are associated with the first set of memory devices.

7. The multiplex transmission system as recited in claim 4 wherein the biasing means includes:

a first bias winding wound about the memory devices of the first set of memory devices so that all the memory devices have the same number of bias winding turns electromagnetically associated therewith;

a second bias winding wound about the memory devices of the second set of memory devices so that all the memory devices have the same number of bias winding turns electromagnetically associated therewith; and means operating in timed relationship with respect to the switching means for applying a bias signal to the bias winding wound about the memory devices associated with the output conductor so that magnetizing forces are applied to the associated memory devices that have assumed the secondary stable states which urge the memory devices toward the primary stable states.

8. A multiplex transmission system for transmitting binary digit data signals in a single output conductor, which comprises:

two sets of magnetic reactor elements, each set including an equal plurality of reactor elements;

means for inducing flux change pulses representative of input data bits in selected reactor elements of a first set of the reactor elements;

means for sequentially inducing maximum flux change pulses in the reactor elements of the second set of reactor elements;

two sets of bistable magnetic memory devices, each set including a plurality of memory devices equal in number to the number of reactor elements within each set of reactor elements; and switching means for alternately associating the first set of reactor elements electromagnetically with the two sets of memory devices and for alternately associating the second set of reactor elements and the output conductor electromagnetically with the set of memory devices not associated with the first set of reactor elements, each reactor element being independently associated electromagnetically with one of the memory devices so that (1), when flux change pulses having prescribed amplitudes are induced in selected reactor elements of the first set, magnetizing forces are applied to the associated memory devices which drive the associated memory devices from primary stable states to secondary stable states to store data bits representative of the input data bits therein and (2), when maximum flux change pulses are sequentially induced in the reactor elements of the second set, magnetizing forces are applied to the associated memory devices which sequentially drive those memory devices that have assumed the secondary stable states to the primary stable states to induce a series of time related output data bits representative of previously stored data bits in the output conductor.

9. A multiplex transmission system for transmitting binary digit data signals in a single output conductor, which comprises:

two sets of magnetic reactor elements, each set including an equal plurality of reactor elements;

two sets of bistable magnetic memory devices, each set including a plurality of memory devices equal in number to the number of reactor elements within each set of reactor elements;

switching means for alternately associating a first set of reactor elements electromagnetically with the two sets of memory devices and for alternately associating the second set of reactor elements and the output conductor electromagnetically with the set of memory devices not associated with the first set of reactor elements, each reactor element being independently associated electromagnetically with one of the memory devices;

storing control means for sequentially inducing maximum flux change pulses in succeeding ones of the reactor elements of the first set that cause magnetizing forces to be sequentially applied to succeeding ones of the associated memory devices which urges the memory devices toward the secondary stable states;

an input winding wound about the reactor elements so as to eletcromagnetically associate therewith, each reactor element having an equal number of input winding turns associated therewith;

means for applying input data bits to the input winding which induce flux change pulses in the associated reactor elements in a predetermined timed relationship with respect to the maximum flux change pulses induced by the storing control means that combine with the maximum flux change pulses induced by the storing control means to cause magnetizing forces to be sequentially applied to selected ones of the associated memory devices which sequentially drive the selected memory devices from the primary stable states to the secondary stable states to store data bits representative of the input data bits; and means for sequentially inducing maximum flux change pulses in the reactor elements of the second set that cause magnetizing forces to be applied to the associated memory devices which sequentially drive the memory devices that have attained the secondary stable states to the primary stable states to induce a series of time related output data bits representative of previously stored data bits in the output conductor.

10. The multiplex transmission system as recited in claim 9 wherein the storing control means includes:
a plurality of electrically independent control windings wound about the reactor elements so as to be electromagnetically associated therewith, each control winding having periodic characteristic variations in the winding pattern which are distinct from but bear a predetermined relationship to the periodic characteristic variations of every other control winding so that a different combination of winding patterns of the control windings is established on each reactor element; and
means for appying control signals to the control windings which have polarities, frequencies, and amplitudes that are determined by the control winding patterns so that a maximum flux change pulse is induced in only one of the reactor elements at any given time and maximum flux change pulses are sequentially induced in succeeding ones of the reactor elements.

11. The multiplex transmission system as recited in claim 9 wherein the storing control means includes:
means for biasing the reactor elements so that the effect of the biasing means must be overcome to induce maximum flux change pulses in succeeding ones of the reactor elements;
a plurality of electrically independent control windings wound about the reactor elements so as to be electromagnetically associated therewith, each control winding having periodic characteristic variations in the winding pattern which are distinct from but bear a predetermined relationship to the periodic characteristic variations of every other control winding so that a different combination of winding patterns of the control windings is established on each reactor element; and
means for applying control signals to the control windings which have polarities, frequencies, and amplitudes that are determined by the control winding patterns so that a maximum magnetizing force is applied to only one of the reactor elements at any given time and maximum magnetizing forces are sequentially applied to succeeding ones of the reactor elements, the maximum magnetizing forces being sufficient to overcome the effect of the biasing means to sequentially induce maximum flux change pulses in succeeding ones of the reactor elements.

12. The multiplex transmission system as recited in claim 8 wherein the means for sequentially inducing maximum flux change pulses in the reactor elements of the second set includes:
means for biasing the reactor elements so that the effect of the biasing means must be overcome to induce maximum flux change pulses in succeeding ones of the reactor elements;
a plurality of electrically independent control windings wound about the reactor elements so as to be electromagnetically associated therewith, each control winding having periodic characteristic variations in the winding pattern which are distinct from but bear a predetermined relationship to the periodic characteristic variations of every other control winding so that a different combination of winding patterns of the control windings is established on each reactor element; and
means for applying control signals to the control windings which have polarities, frequencies, and amplitudes that are determined by the control winding patterns so that a maximum magnetizing force is applied to only one of the reactor elements at any given time and maximum magnetizing forces are sequentially applied to succeeding ones of the reactor elements, the maximum magnetizing forces being sufficient to overcome the effect of the biasing means to sequentially induce maximum flux change pulses in succeeding ones of the reactor elements.

13. A composite transmission system including a plurality of multiplex transmission systems as recited in claim 8 which are associated with the same output conductor wherein:
a single means is provided for inducing maximum flux change pulses in the second set of reactor elements of all the multiplex transmission systems, the single means sequentially inducing maximum flux change pulses in succeeding reactor elements within succeeding multiplex transmission systems in the time period required for the means of each multiplex transmission system to induce flux change pulses representative of input data bits in selected reactor elements of the associated first set of reactor elements so that a series of time related data bits representative of data bits previously stored in all the multiplex transmission systems is induced in the output conductor while data bits representative of input data bits are independently stored in each multiplex transmission system.

14. The multiplex transmission system as recited in claim 8, wherein means are provided for synchronizing operation of the switching means with respect to operation of the flux change inducing means so that the switching means is prevented from operating to change the association of the two sets of reactor elements with respect to the two sets of memory devices until the series of time related data bits representative of previously stored data bits has been induced in the output conductor.

15. A multiplex transmission system for receiving binary digit data signals transmitted in a single input conductor, which comprises:
a plurality of data receivers;
two sets of bistable memory devices, each set including a plurality of memory devices equal in number to the number of data receivers;

storing control means responsive to a series of time related input data bits transmitted in the input conductor for causing selected memory devices within a selected set to be sequentially driven from primary stable states to secondary stable states to store data bits representative of the input data bits;

read out control means operating concomitantly with the storing control means for causing the memory devices within a selected set of memory devices which have attained the secondary stable states to be sequentially driven to the primary stable states so that data bits representative of previously stored data bits are sequentially transmitted to selected ones of the data receivers; and switching means for alternately associating the storing control means with the two sets of memory devices and for alternately associating the read out control means and the data receivers with the set of memory devices not associated with the storing control means so that data bits representative of a series of time related input data bits transmitted in the input conductor may be stored while data bits representative of previously stored data bits are sequentially read out.

16. A multiplex transmission system for receiving binary digit data signals transmitted in a single input conductor, which comprises:

a plurality of data receivers;

two sets of bistable magnetic memory devices, each set including a plurality of memory devices equal in number to the number of data receivers;

switching means for alternately associating the input conductor electromagnetically with the two sets of memory devices and for alternately associating the data receivers electromagnetically with the set of memory devices not associated with the input conductor so that data bits representative of a series of time related input data bits transmitted in the input conductor may be sequentially stored while data bits representative of previously stored data bits are sequentially read out, the input conductor being associated electromagnetically with all of the memory devices in the set with which it is associated so that, when an input data bit is transmitted therein, magnetizing forces are applied to the associated memory devices which urge the memory devices toward the secondary stable states, each data receiver being independently associated electromagnetically with one of the memory devices in the set with which the data receivers are associated so that a data bit representative of a previously stored data bit may be independently transmitted to the data receiver;

storing control means operating in timed relationship with respect to the switching means for sequentially applying magnetizing forces to the memory devices associated with the input conductor in timed relationship with respect to magnetizing forces applied thereto by input data bits which urge the memory devices toward the secondary stable states and which combine with the magnetizing forces applied thereto by the input data bits to sequentially drive selected ones of the memory devices from the primary stable states to the secondary stable states to store data bits representative of the input data bits therein; and read out control means operating concomitantly with the storing control means for sequentially applying magnetizing forces to succeeding ones of the memory devices associated with the data receivers that have attained the secondary stable states which sequentially drive the memory devices to the primary stable states so that data bits representative of previously stored data bits are sequentially transmitted to the associated data receivers.

17. A multiplex transmission system for binary digit data signals, which comprises:

a plurality of data units;

two sets of bistable memory devices, each set including a plurality of memory devices equal in number to the number of data units;

an output-input conductor;

storing control means responsive to input data bits for causing selected memory devices within a selected set of memory devices to be sequentially driven from primary stable states to secondary stable states to store data bits representative of the input data bits therein;

read out control means operative concomitantly with the storing control means for causing the memory devices within a selected set of memory devices which have attained the secondary stable states to be sequentially driven to the primary stable states to read out previously stored data bits;

switching means for alternately associating the storing control means with the two sets of memory devices and for alternately associating the read out control means with the set of memory devices not associated with the storing control means so that data bits may be stored while previously stored data bits are read out; and operating control means (1) for associating the output-input conductor with the read out control means and the data units with the storing control means, when input data bits are produced in the data units, so that data bits representative of the input data bits are sequentially stored independently in selected memory devices of a selected set of memory devices while a series of time related data bits representative of previously stored data bits are induced in the output-input conductor and (2) for associating the data units with the read out control means and the output-input conductor with the storing control means, when a series of time related input data bits are transmitted in the output-input conductor, so that data bits representative of the input data bits are sequentially stored independently in selected memory devices of a selected set of memory devices while data bits representative of previously stored data bits are sequentially induced in selected ones of the data units.

18. A multiplex transmission system for receiving binary digit data signals transmitted in a single input conductor, which comprises:

a data receiver;

a plurality of bistable memory devices equal in number to the number of binary digit data signals to be received;

storing control means responsive to a series of time related input data bits transmitted in the input conductor for causing selected ones of the memory devices to be sequentially driven from primary stable states to secondary stable states to store data bits representative of the input data bits; and read out control means responsive to completion of the operation of the storing control means for associating the memory devices with the data receiver and for causing the memory devices which have attained the secondary stable states to be sequentially driven to the primary stable states so that data bits representative of previously stored data bits are sequentially transmitted to the data receiver.

19. A multiplex transmission system for receiving binary digit data signals transmitted in a single input conductor, which comprises:

a data receiver;

a purality of bistable magnetic memory devices equal in number to the number of binary digit data signals to be received;

storing control means responsive to a series of time related input data bits transmitted in the input conductor for sequentially applying magnetizing forces to selected ones of the memory devices which sequentially drive the selected memory devices from the primary stable states to the secondary stable states to store data bits representative of the input data bits therein; and read out control means responsive to completion of the operation of the storing control means for electromagnetically associating the memory devices with the data receiver and for sequentially applying magnetizing forces to succeeding ones of the memory devices that have attained the secondary stable states which sequentially drive the memory devices to the primary stable states so that data bits representative of previously stored data bits are sequentially transmitted to the data receiver.

20. A composite transmission system including a plurality of multiplex transmission systems as recited in claim 19 which are associated with the same input conductor, wherein:

a single storing control means is provided for sequentially applying magnetizing forces to selected ones of the memory devices of all the transmission systems which sequentially drive the selected memory devices from the primary stable states to the secondary stable states; and a single read out control means is provided for electromagnetically associating the memory devices of one multiplex transmission system with the data receiver thereof for sequentially applying magnetizing forces to the memory devices of the one multiplex transmission system that have attained the secondary stable states which sequentially drive the memory devices to the primary stable states while magnetizing forces are being applied to the selected memory devices of the other multiplex transmission systems by the storing control means so that data bits representative of previously stored data bits are sequentially transmitted to the data receiver of one multiplex transmission system while data bits representative of input data bits are sequentially stored in the other multiplex transmission systems.

21. A multiplex transmission system for binary digit data signals, which comprises:

a plurality of data sources;

two sets of bistable transmitting memory devices, each set including a plurality of memory devices equal in number to the number of data sources;

an output-input conductor;

a data receiving circuit;

storing control means responsive to input data signals produced by the data sources for causing selected memory devices within a selected set of transmitting memory devices to be driven from primary stable states to secondary stable states to store data bits representative of the input data bits therein;

read out control means operating concomitantly with the storing control means for causing succeeding ones of the memory devices within a selected set of the transmitting memory devices that have attained the secondary stable states to be sequentially driven to the primary stable states so that a series of time related data bits are induced in the output-input conductor;

switching means for alternately associating the storing control means with the two sets of transmitting memory devices and for alternately associating the read out control means and the output-input conductor with the set of memory devices not associated with the storing control means so that data bits representative of input data bits produced by the data sources are stored while data bits representative of previously stored data bits are sequentially read out; and receiving control means responsive to the series of time related data bits induced in the output conductor for causing data bits representative of the time related data bits to be sequentially transmitted to the data receiving circuit.

22. The multiplex transmission system as recited in claim 21 wherein the data receiving circuit includes a plurality of data receivers equal in number to the number of data sources, and wherein the receiving control means includes:

two sets of bistable receiving memory devices, each set including a plurality of memory devices equal in number to the number of data receivers;

storing control means responsive to a series of time related input data bits transmitted in the output-input conductor for causing selected memory devices within a selected set of receiving memory devices to be sequentially driven from primary stable states to secondary stable states to store data bits representative of the time related data bits;

read out control means operating concomitantly with the storing control means for causing the memory devices within a selected set of receiving memory devices which have attained the secondary stable states to be sequentially driven to the primary stable states so that data bits representative of previously stored data bits are sequentially transmitted to selected ones of the data receivers; and switching means for alternately associating the storing control means with the two sets of receiving memory devices and for alternately associating the read out control means and the data receivers with the set of memory devices not associated with the storing control means so that data bits representative of a series of time related input data bits transmitted in the input conductor may be stored while data bits representative of previously stored data bits are sequentially read out.

23. A multiplex transmission system for binary digit data signals, which comprises:

a plurality of data sources;

two sets of bistable transmitting memory devices, each set including a plurality of memory devices equal in number to the number of data sources;

an output-input conductor;

a data receiver;

storing control means responsive to input data bits produced by the data sources for causing selected memory device within a selected set of transmitting memory devices to be driven from primary stable states to secondary stable states to store data bits representative of the input data bits therein;

read out control means operating concomitantly with the storing control means for causing the memory devices within a selected set of transmitting memory devices which have attained the secondary stable states to be sequentially driven to the primary stable states so that data bits representative of previously stored data bits are induced in the output-input conductor;

switching means for alternately associating the storing control means with the two sets of transmitting memory devices and for alternately associating the read out control means and the output-input conductor with the set of memory devices not associated with the storing control means so that data bits representative of input data bits produced by the data source are stored while data bits representative of previously stored data bits are sequentially read out;

a plurality of bistable receiving memory devices equal in number to the number of data sources;

storing control means responsive to a series of time related data bits transmitted in the output-input conductor for causing selected ones of the receiving memory devices to be sequentially driven from primary stable states to secondary stable states to store data bits representative of time related data bits; and read out control means responsive to completion of the operation of the storing control means for associating the receiving memory devices with the data receiver and for causing the receiving memory devices which have attained the secondary stable states to be sequentially driven to the primary stable states so that data bits representative of previously stored data bits are sequentially transmitted to the data receiver.

24. A composite transmission system including a plurality of multiplex transmission systems as recited in claim 23 which are associated with the same output-input conductor, wherein:

a single read out control means is provided for causing succeeding ones of the transmitting memory devices of all the multiplex transmission systems that have attained the secondary stable states to be sequentially driven to the primary stable states in the time period required for the storing control means of each multiplex transmission system to cause selected memory devices within a selected set of transmitting memory devices to be driven from the primary stable states to the secondary stable states so that a series of time related data bits representative of data bits previously stored in all the multiplex transmission systems is induced in the output-input conductor while data bits representative of the input data bits are independently stored in each multiplex transmission system;

a single storing control means is provided for causing selected ones of the receiving memory devices of all the transmission systems to be sequentially driven from the primary stable states to the secondary stable states to store data bits representative of the time related data bits; and a single read out control means is provided for associating the receiving memory devices of one multiplex transmission system with the data receiver thereof and for causing the receiving memory devices of the one multiplex transmission system which have attained the secondary stable states to be sequentially driven to the primary stable states while selected ones of the receiving memory devices of the other multiplex transmission systems are being sequentially driven from the primary stable states to the secondary stable states by the storing control means so that data bits representative of previously stored data bits are sequentially transmitted to the data receiver of one multiplex transmission system while data bits are sequentially stored in the other multiplex transmission systems.

No references cited.

ROBERT L. GRIFFIN, *Primary Examiner.*

J. T. STRATMAN, *Assistant Examiner.*